United States Patent
Wu et al.

(10) Patent No.: US 9,463,711 B2
(45) Date of Patent: Oct. 11, 2016

(54) POWER SYSTEM OF ELECTRIC VEHICLE, ELECTRIC VEHICLE COMPRISING THE SAME AND METHOD FOR HEATING BATTERY GROUP OF ELECTRIC VEHICLE

(71) Applicant: BYD COMPANY LIMITED, Shenzhen (CN)

(72) Inventors: Xingchi Wu, Shenzhen (CN); Hongjun Wang, Shenzhen (CN); Shibin Xie, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 134 days.

(21) Appl. No.: 14/403,432

(22) PCT Filed: May 22, 2013

(86) PCT No.: PCT/CN2013/076089
§ 371 (c)(1),
(2) Date: Nov. 24, 2014

(87) PCT Pub. No.: WO2013/174268
PCT Pub. Date: Nov. 28, 2013

(65) Prior Publication Data
US 2015/0105956 A1    Apr. 16, 2015

(30) Foreign Application Priority Data
May 22, 2012    (CN) .......................... 2012 1 0160417

(51) Int. Cl.
*H01M 10/625* (2014.01)
*B60L 11/18* (2006.01)
*H01M 10/637* (2014.01)
(Continued)

(52) U.S. Cl.
CPC ............ *B60L 11/1875* (2013.01); *B60L 15/20* (2013.01); *H01M 10/613* (2015.04); *H01M 10/625* (2015.04); *H01M 10/633* (2015.04);
(Continued)

(58) Field of Classification Search
None
See application file for complete search history.

(56) References Cited

U.S. PATENT DOCUMENTS 5,281,792 A * 1/1994 Lee .......................... H02J 7/00
                                                        219/209
9,156,371 B2 * 10/2015 Wu ..................... B60L 11/1875
(Continued)

FOREIGN PATENT DOCUMENTS

CN       1630129 A      6/2005
CN       1956287 A      5/2007
(Continued)

*Primary Examiner* — Redhwan K Mawari
*Assistant Examiner* — Edward Torchinsky
(74) *Attorney, Agent, or Firm* — Anova Law Group, PLLC

(57) ABSTRACT

A power system of an electric vehicle, an electric vehicle comprising the same and a method for heating a battery group of the electric vehicle are provided. The power system comprises: a battery group; a battery heater, in which the battery heater comprises a output power adjusting module configure to adjust a heating power of the battery heater by adjusting a charge current and/or a discharge current; a battery management device configured to control the output power adjusting module to adjust the heating power of the battery heater to heat the battery group according to a temperature of the battery group when the temperature of the battery group is lower than a first heating threshold and a residual electric quantity of the battery group is larger than a parking electric quantity threshold; a motor controller connected with a motor and an electric distribution box respectively; and an isolation inductor.

22 Claims, 9 Drawing Sheets

(51) Int. Cl.
  *H01M 10/633* (2014.01)
  *H01M 10/613* (2014.01)
  *B60L 15/20* (2006.01)

(52) U.S. Cl.
  CPC ........... *H01M10/637* (2015.04); *Y02T 10/705* (2013.01); *Y02T 10/7005* (2013.01); *Y02T 10/7258* (2013.01)

(56) References Cited

U.S. PATENT DOCUMENTS

| | | | |
|---|---|---|---|
| 9,308,828 B2* | 4/2016 | Wu | B60L 1/003 |
| 2005/0274705 A1 | 12/2005 | Zhu et al. | |
| 2007/0210769 A1 | 9/2007 | Tsutsumi et al. | |
| 2010/0050676 A1 | 3/2010 | Takamatsu et al. | |
| 2011/0298427 A1 | 12/2011 | Uemura et al. | |
| 2015/0015207 A1* | 1/2015 | Wang | B60L 11/1816 320/135 |
| 2015/0142237 A1* | 5/2015 | Wu | B60L 1/003 701/22 |
| 2015/0166045 A1* | 6/2015 | Chen | B60L 1/003 701/22 |
| 2016/0059733 A1* | 3/2016 | Hettrich | B60L 11/1875 701/2 |

FOREIGN PATENT DOCUMENTS

| | | |
|---|---|---|
| CN | 101503063 A | 8/2009 |
| CN | 101931110 A | 12/2010 |
| CN | 102013533 A | 4/2011 |
| CN | 102055042 A | 5/2011 |
| CN | 201893429 U | 7/2011 |
| CN | 102241251 A | 11/2011 |
| CN | 102361105 A | 2/2012 |
| EP | 1821573 A2 | 8/2007 |
| JP | 2009072003 A | 4/2009 |
| JP | 2010119171 A | 5/2010 |
| JP | 2012-9407 A | 1/2012 |
| WO | 2008096899 A | 8/2008 |

* cited by examiner

POWER SYSTEM OF ELECTRIC VEHICLE, ELECTRIC VEHICLE COMPRISING THE SAME AND METHOD FOR HEATING BATTERY GROUP OF ELECTRIC VEHICLE

CROSS-REFERENCE TO RELATED APPLICATION

This application is a national phase entry under 35 U.S.C. §371 of International Application No. PCT/CN2013/076089, filed on May 22, 2013, which claims the priority to, and benefits of Chinese patent application No. 201210160417.5, filed with the State Intellectual Property Office of P. R. C., on May 22, 2012, the entire contents of all of which are incorporated herein by reference.

FIELD OF THE INVENTION

Exemplary embodiments of the present disclosure relate generally to a power system and, more particularly, to a power system of an electric vehicle, an electric vehicle comprising the power system and a method for heating a battery group of the electric vehicle.

BACKGROUND

With the development of the science and technology, new energy vehicles especially electric vehicles, gradually enter into ordinary families as a means of transportation. The performance requirement, especially the comfort requirement of a user for the vehicle, is higher and higher, which requires that the vehicle must adapt to different operating requirements. But currently most electric vehicles cannot satisfy such requirements. Especially in winter, the temperature is low so that the capability of a battery, no matter the discharge capability or the battery capacity, may be decreased or the battery cannot even be used. Specifically, the work temperature of the battery especially lithium ion battery is generally within a range from −20° C. to 55° C., and the battery is not allowed to be charged at a low temperature. Under a low temperature condition, the battery in the electric vehicle may have the following problems. (1) The lithium ions may be deposited easily at the negative electrode and lose the electrical activity at the low temperature, and therefore, if the battery in the electric vehicle is frequently used at the low temperature, the life of the battery may be shortened and a safety problem may be caused accordingly. (2) When the lithium ion battery is charged at the low temperature, the lithium ions may be deposited easily at the negative electrode to become dead ions and thus the capacity of the battery may be decreased. Moreover, the deposited ions grow larger and larger during the continuous use, thus leading to a potential danger such as an internal short circuit. (3) The discharge capability of the battery is limited at the low temperature. All of the problems listed above may be not favorable for the electric vehicle which uses green and environment friendly new energy.

The method for heating a battery is an important technology in the electric vehicle field. A heating strategy of the battery and the performance of the battery heater influence the comfort, operation stability and safety of the vehicle directly. Many new technologies are applied in the battery heating, but because of the self-capability defects, these technologies are not widely applied in the vehicle field. For example, a thermal insulation sleeve is provided to warm a battery by thermal insulation material; an infrared radiation film is used to heat the battery and a thermal insulation sleeve is provided to keep warm; or a heating patch is attached on the surface of the battery. These methods are only suitable for the fixed battery. Furthermore, using the external power to heat the battery is not suitable for the vehicle which is not fixed in position. Therefore, the above methods have not been widely applied in the electric vehicle field.

BRIEF SUMMARY OF THE DISCLOSURE

According to a first aspect of the present disclosure, a power system of an electric vehicle is provided. The power system comprises: a battery group; a battery heater, connected with the battery group and configured to charge and discharge the battery group to heat the battery group, in which the battery heater comprises an output power adjusting module configured to adjust a heating power of the battery heater by adjusting a charge current and/or a discharge current; a battery management device, connected with the battery group and the battery heater respectively, configured to control the output power adjusting module to adjust the heating power of the battery heater to heat the battery group according to a temperature of the battery group when the temperature of the battery group is lower than a first heating threshold and a residual electric quantity of the battery group is larger than a parking electric quantity threshold; an electric distribution box, configured to distribute a voltage output by the battery group; a motor; a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box; and an isolation inductor, connected between the battery group and the electric distribution box, in which an inductance of the isolation inductor matches with a capacitance of the pre-charging capacitor.

With the power system of the electric vehicle according to embodiments of the present disclosure, by using a large current discharge of the battery group in the electric vehicle, the internal resistor of the battery itself may be heated so that the battery group may be heated. Without any external power supply, the electricity for heating is totally supplied by the battery group. A heating management may be performed for the battery group by the battery management device and the battery heater, which may greatly reduce the restriction on the use of the electric vehicle at the low temperature, thus satisfying the requirements of running and charging at the low temperature. Moreover, the power system heats the battery group directly, and therefore, a higher heating efficiency, a lower cost and a better utility may be obtained.

According to a second aspect of the present disclosure, an electric vehicle comprising the above power system is provided. The electric vehicle can normally run in a cold region and the battery group can be heated while the electric vehicle is running, thus ensuring a safe and smooth running.

According to a third aspect of the present disclosure, a method for heating a battery group of an electric vehicle is provided, comprising: detecting a temperature and a residual electric quantity of the battery group; if the temperature of the battery group is lower than a first heating threshold and the residual electric quantity of the battery group is larger than a parking electric quantity threshold, adjusting a heating power of a battery heater to heat the battery group according to the temperature of the battery group; and if the temperature of the battery group is lower than the first heating threshold and the residual electric quantity of the battery group is lower than the parking electric quantity threshold, indicating the battery group is inhibited from being heated or charged and the electric vehicle is inhibited from being driven.

With the method for heating the battery group of the electric vehicle according to embodiments of the present disclosure, the battery group may be heated directly without any external power supply. The temperature of the battery group may be increased to a required temperature and then the battery group may be charged or discharged normally, which may greatly reduce the restriction on the use of the electric vehicle at the low temperature, thus satisfying the requirements of running and charging at the low temperature. Furthermore, by adjusting the heating power of the battery heater according to the real-time temperature of the battery group, it is possible to control the heating procedure more precisely to make better use of the performance of the battery group and increase the safety of the battery group.

BRIEF DESCRIPTION OF THE DRAWINGS

Having thus described exemplary embodiments of the present disclosure in general terms, reference will now be made to the accompanying drawings, which are not necessarily drawn to scale.

Figure 1:
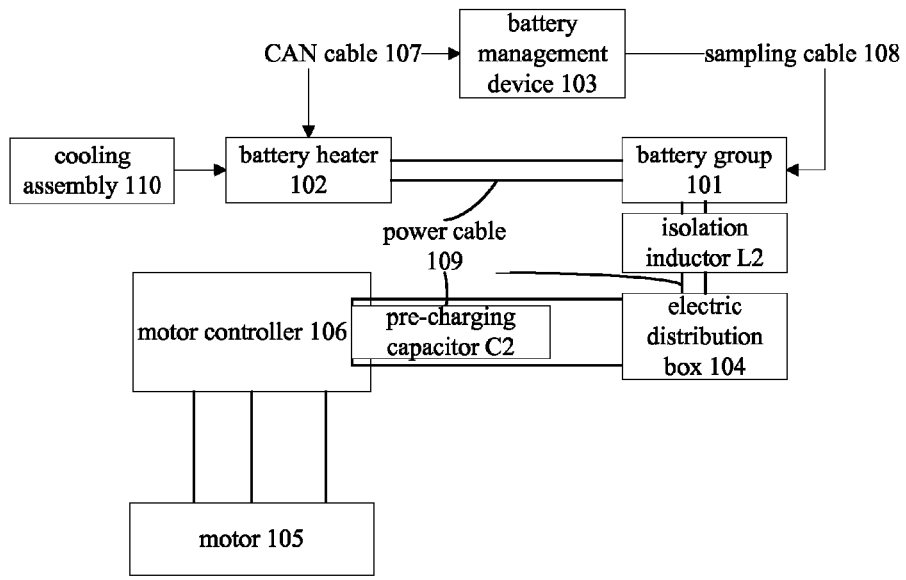
Figure 2:
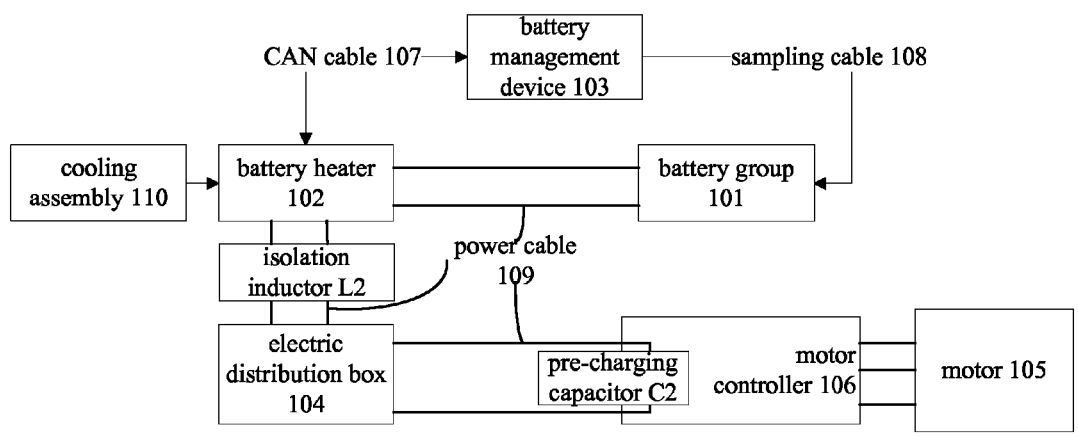
Figure 3A:
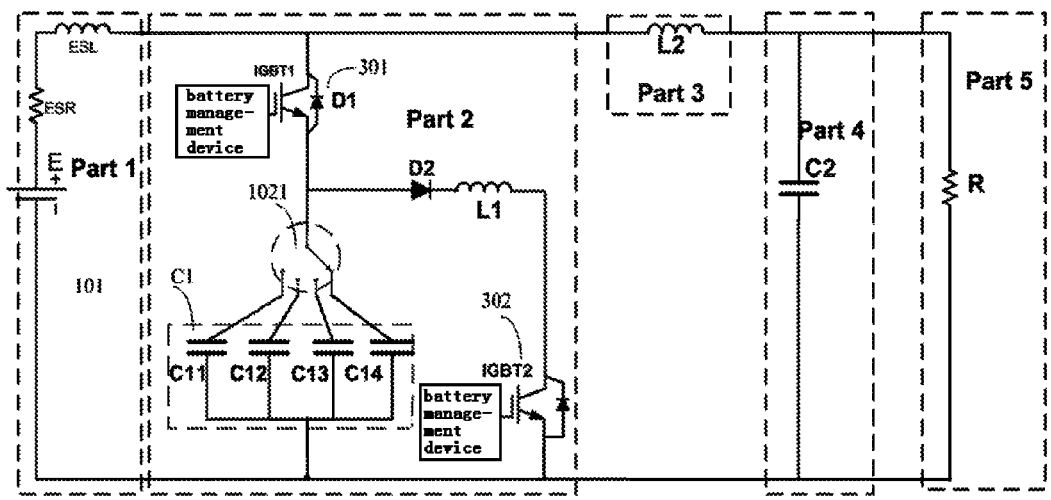
Figure 3B:
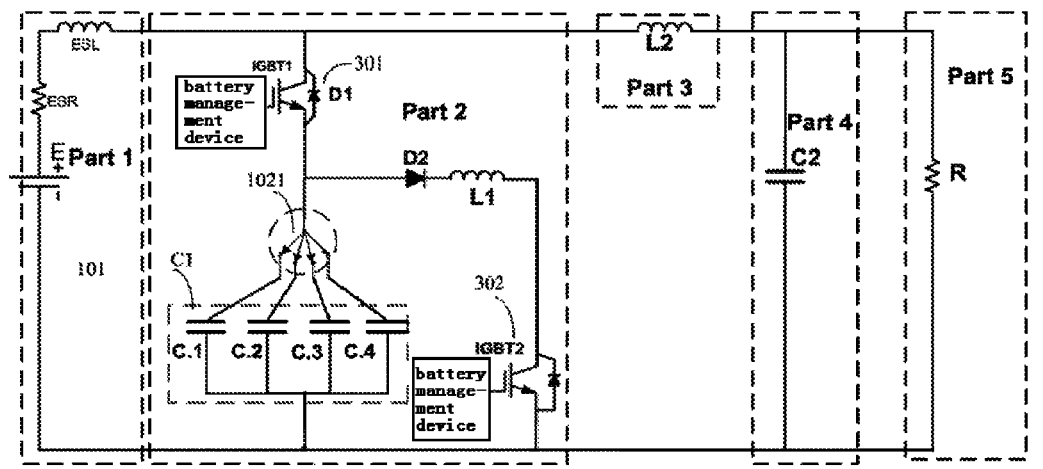
Figure 4:
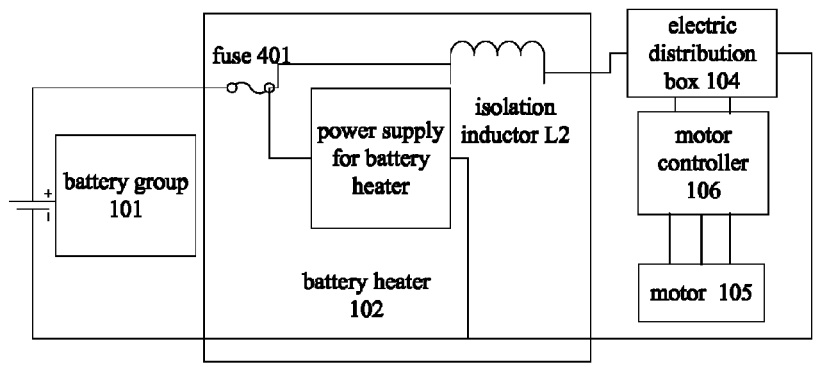
Figure 5:
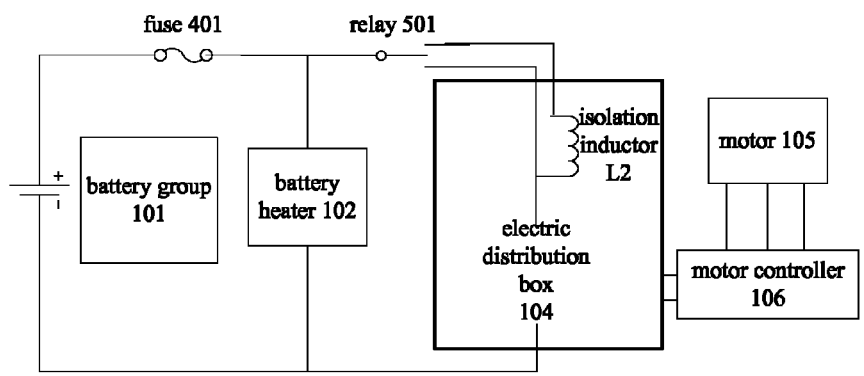
Figure 6:
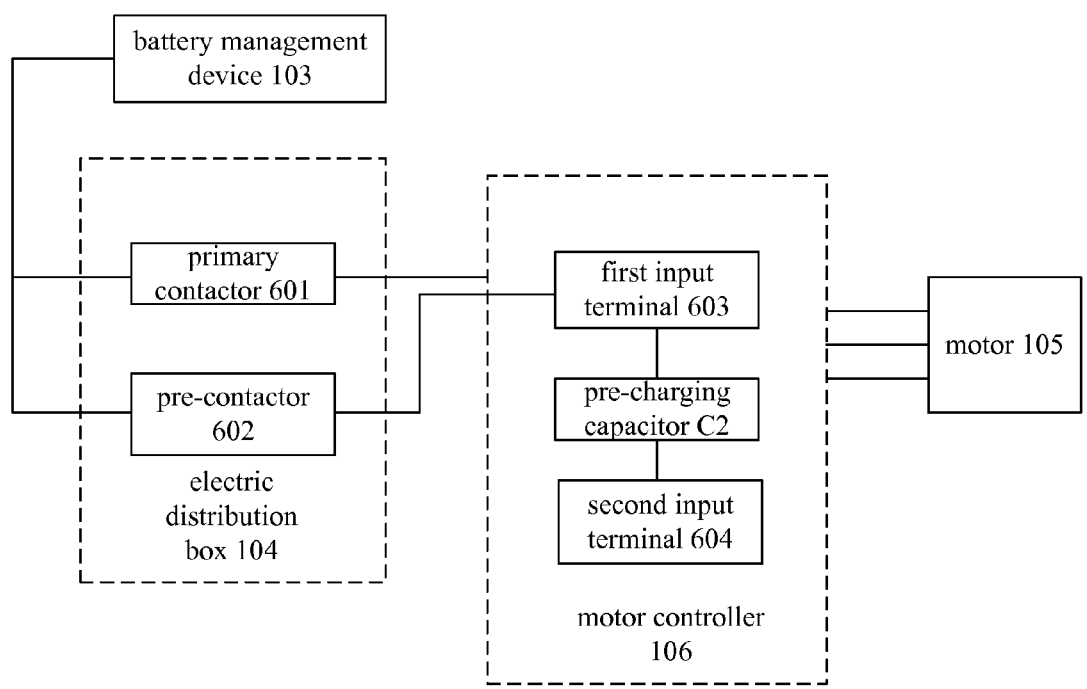
Figure 7:
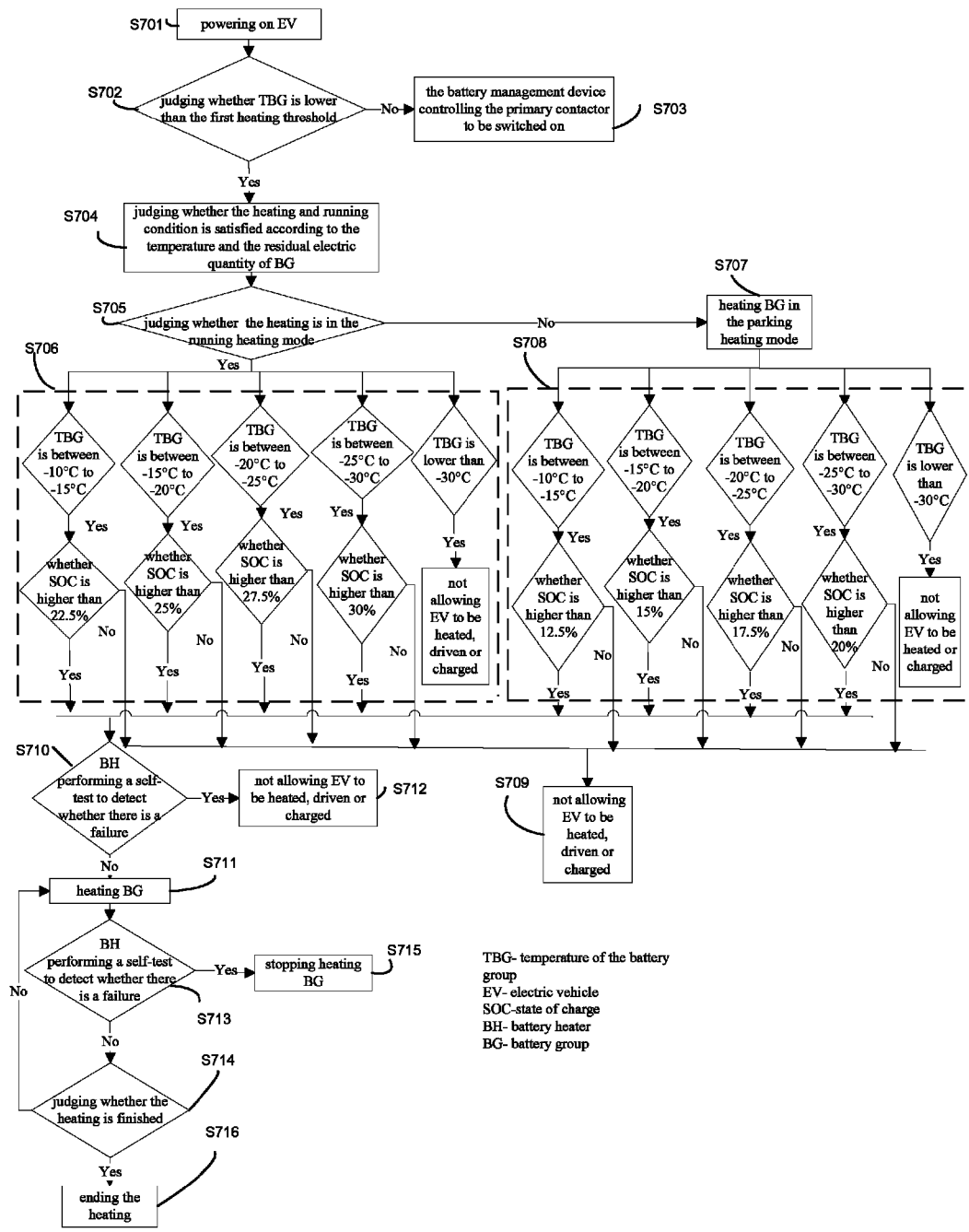
Figure 8:
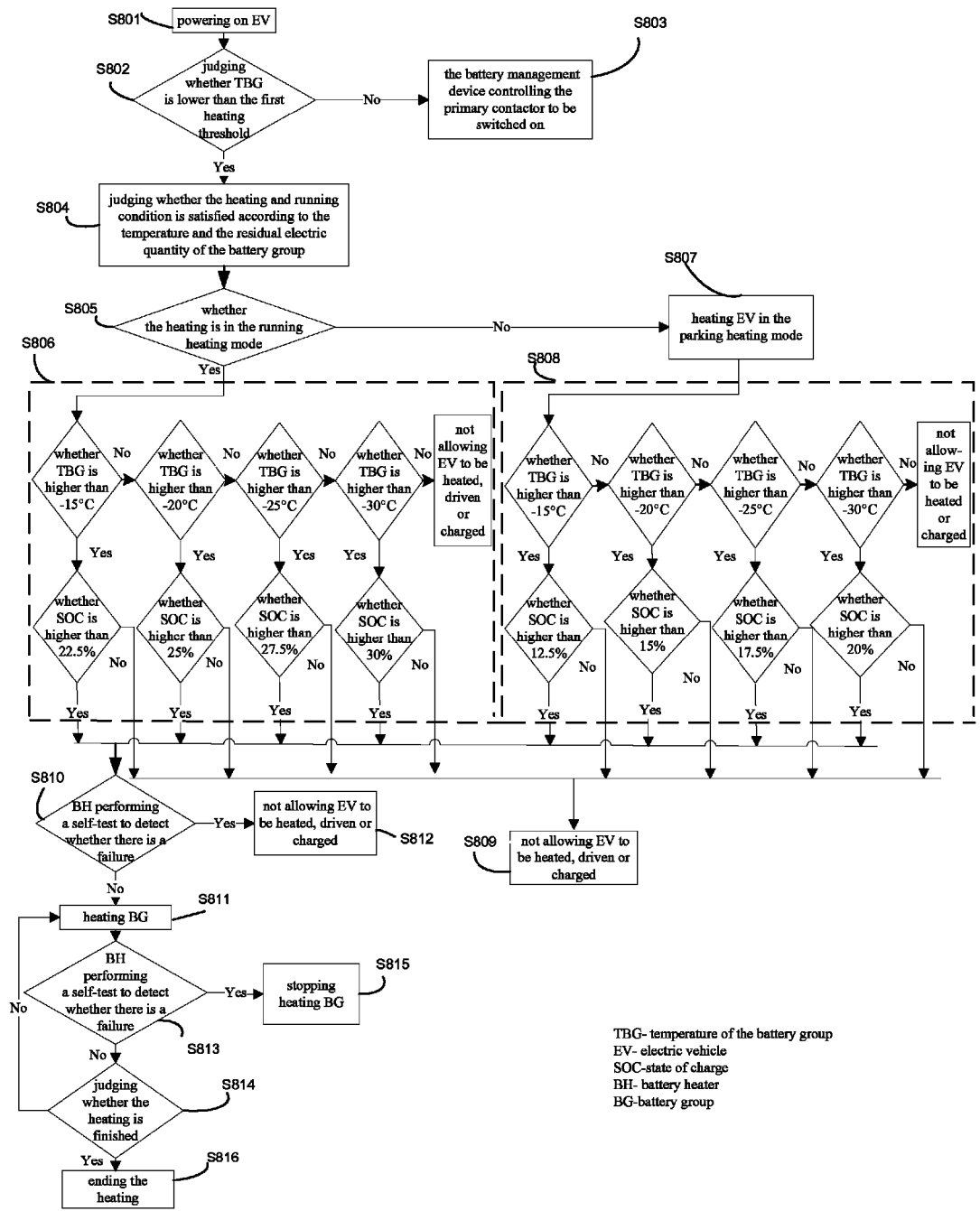
Figure 9:
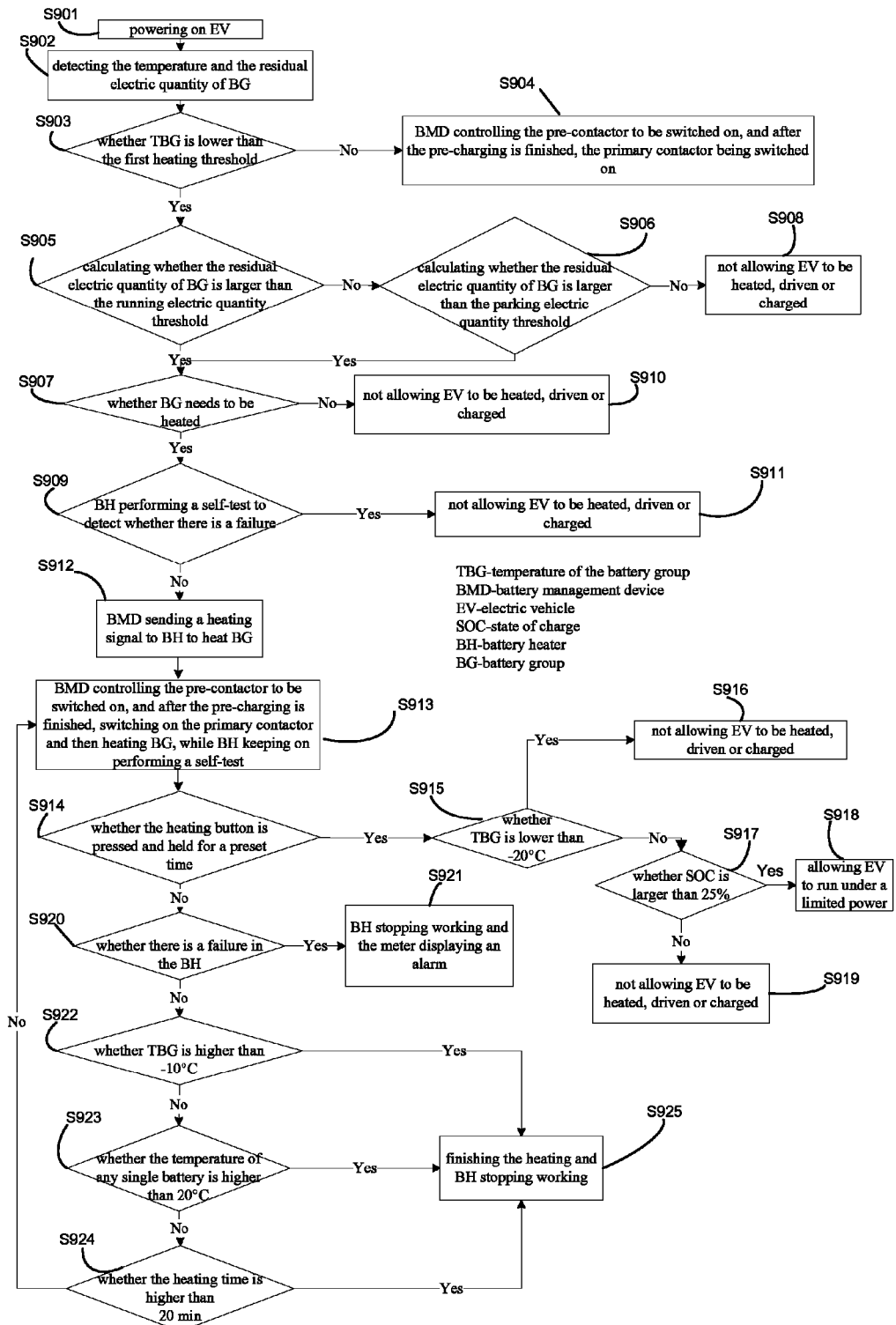
Figure 10:
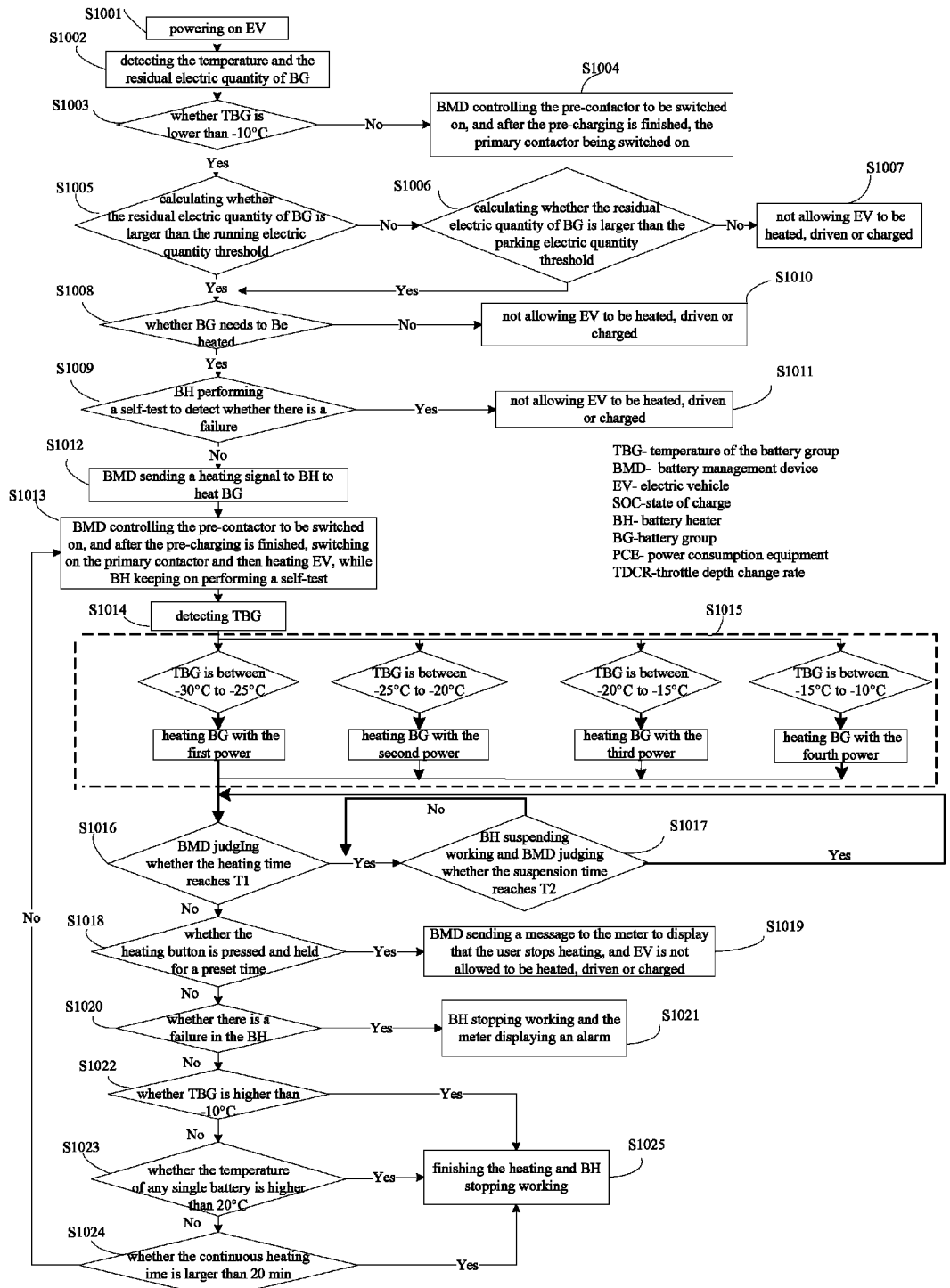
Figure 11:
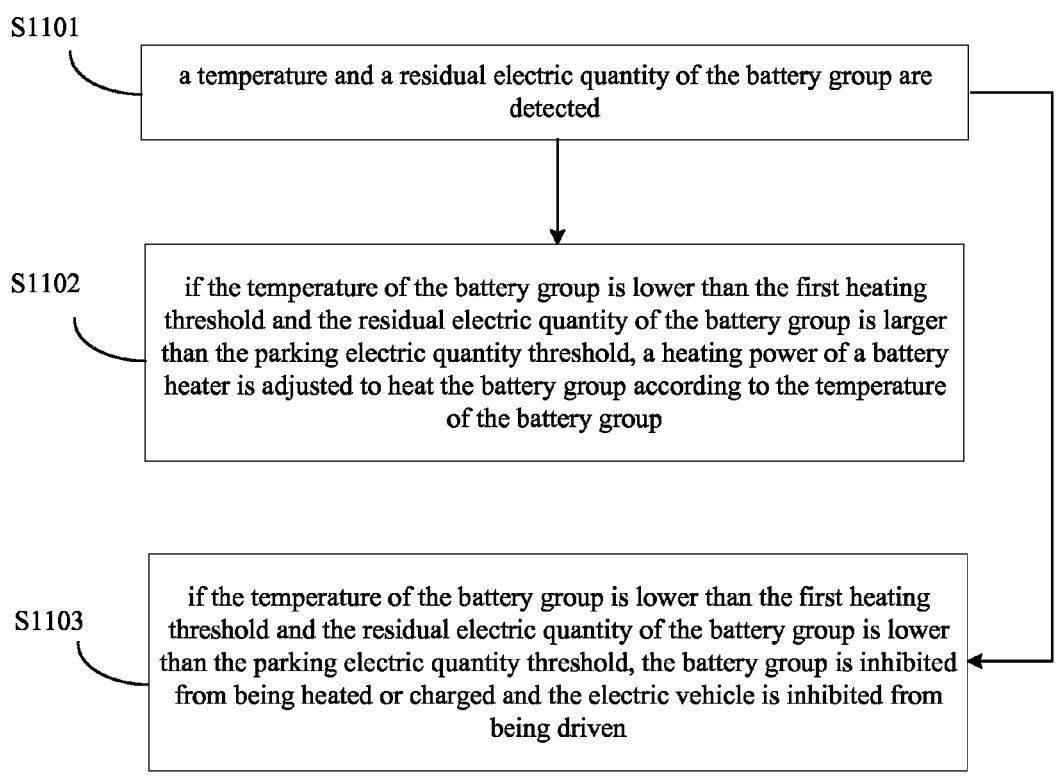

FIG. 1 illustrates a schematic diagram of a power system of an electric vehicle according to an exemplary embodiment;

FIG. 2 illustrates a schematic diagram of a power system of an electric vehicle according to an exemplary embodiment;

FIG. 3A illustrates an electric principle diagram of a power system of an electric vehicle according to an exemplary embodiment;

FIG. 3B illustrates an electric principle diagram of a power system of an electric vehicle according to an exemplary embodiment;

FIG. 4 illustrates an electric connection diagram of a power system of an electric vehicle according to an exemplary embodiment;

FIG. 5 illustrates an electric connection diagram of a power system of an electric vehicle according to an exemplary embodiment;

FIG. 6 illustrates a schematic diagram of an electric distribution box in a power system of an electric vehicle according to an exemplary embodiment;

FIG. 7 illustrates a flow chart of a method for heating a battery group of an electric vehicle according to an exemplary embodiment;

FIG. 8 illustrates a flow chart of a method for heating a battery group of an electric vehicle according to an exemplary embodiment;

FIG. 9 illustrates a flow chart of a method for heating a battery group of an electric vehicle according to an exemplary embodiment;

FIG. 10 illustrates a flow chart of a method for heating a battery group of an electric vehicle according to an exemplary embodiment; and FIG. 11 illustrates a flow chart of a method for heating a battery group of an electric vehicle according to an exemplary embodiment.

DETAILED DESCRIPTION

Reference will now be made in detail to exemplary embodiments, examples of which are illustrated in the accompanying drawings. It is readily appreciated by those having ordinary skill in the art that the presently claimed subject matter may be embodied in many different forms and should not be construed as limited to the embodiments set forth herein.

In the description, relative terms such as "longitudinal", "lateral", "lower", "upper", "front", "rear", "left", "right". "horizontal", "vertical", "above", "below", "up", "top", "bottom" "external", "internal" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description, terms concerning attachments, coupling and the like, such as "connected" and "interconnected", refer to a relationship in which structures are secured or attached to one another through mechanical or electrical connection, or directly or indirectly through intervening structures, unless expressly described otherwise. Specific implications of the above phraseology and terminology may be understood by those skilled in the art according to specific situations.

Referring to FIG. 1 and FIG. 2, in some embodiments of the present disclosure, a power system of an electric vehicle comprises: a battery group 101, a battery heater 102, a battery management device 103, an electric distribution box 104, a motor 105, a motor controller 106 and an isolation inductor L2. The battery heater 102 is connected with the battery group 101 and configured to charge and discharge the battery group 101 to heat the battery group 101.

Referring to FIG. 3A or FIG. 3B, the battery heater 102 includes an output power adjusting module 1021, and the output power adjusting module 1021 is configured to adjust a heating power of the battery heater 102 by adjusting a discharge current and/or a charge current. The battery management device 103 is connected with the battery heater 102 via a CAN (controller area network) cable 107 and connected with the battery group 101 via a sampling cable 108 to sample the temperature and voltage of each battery and the output current of the battery group 101. In addition, the battery management device 103 is also configured to judge the current status of the electric vehicle, to calculate the temperature and the residual electric quantity of the battery group 101, and to send the control signals to the relevant electric devices via the CAN cable 107 so as to manage the related devices.

Specifically, the battery management device 103 is configured to control the output power adjusting module 1021 to adjust the heating power of the battery heater 102 to heat the battery group 101 according to the temperature of the battery group 101 when the temperature of the battery group 101 is lower than a first heating threshold and the residual electric quantity of the battery group 101 is larger than a parking electric quantity threshold. The electric distribution box 104 is a high voltage device for turning on and off the large current. A voltage output by the battery group 101 is distributed by the battery management device 103 by sending a control signal to the electric distribution box 104.

The motor controller 106 is connected with the motor 105 and the electric distribute box 104 respectively, and includes a first input terminal, a second input terminal and a precharging capacitor C2 connected between the first input terminal and the second input terminal. The motor controller 106 is configured to supply power to the motor 105 according to a control command and a voltage distributed to the motor controller 106 by the electric distribution box 104. Specifically, the motor controller 106 converts the DC supplied by the battery group 101 into the three-phase AC required by the motor 105 to supply power to the motor 105 by the internal driving circuit of the motor controller 106, and controls the motor 105 according to the control signal sent by the battery management device 103. The isolation inductor L2 is connected between the battery group 101 and the electric distribution box 104, and the inductance of the isolation inductor L2 matches with the capacitance of the pre-charging capacitor C2.

In one embodiment of the present disclosure, the battery heater 102 may be configured to perform a failure self-test and send the test result to the battery management device 103.

Referring to FIGS. 3A and 3B, the battery heater 102 further includes: a first switch module 301, at least one first capacitor C1, a first inductor L1 and a second switch module 302. A first terminal of the at least one first switch module 301 is connected with a first electrode of the battery group 101 and the isolation inductor L2 respectively. A first terminal of the at least one first capacitor C1 is connected with a second terminal of the first switch module 301 via the output power adjusting module 1021, and a second terminal of the at least one first capacitor C1 is connected with a second electrode of the battery group 101.

A first terminal of the first inductor L1 is connected with a node between the first switch module 301 and the at least one first capacitor C1. A first terminal of the second switch module 302 is connected with a second terminal of the first inductor L1, and a second terminal of the second switch module 302 is connected with the second electrode of the battery group 101. The control terminal of the first switch module 301 and the control terminal of the second switch module 302 are connected with the battery management device 103.

The battery management device 103 sends a heating signal to the control terminal 5I of the first switch module 301 and the control terminal of the second switch module 302 to control the first switch module 301 and the second switch module 302 to turn on in turn so as to generate a charge current and a discharge current in turn. When the first switch module 301 is on, the second switch module 302 is off, and when the second switch module 302 is on, the first switch module 301 is off. It should be noted that, in one embodiment, there may be one first capacitor C1 or a plurality of first capacitors C1 in the battery heater 102. Referring to FIG. 3A-3B, the number of the first capacitors C1 is 4. For clarity purpose, the four first capacitors C1 in FIG. 3A are denoted by C11, C12, C13 and C14 respectively, and the four first capacitors C1 in FIG. 3B are denoted by C.1, C.2, C.3 and C.4 respectively.

Referring to FIGS. 3A-3B, the ESR is an equivalent resistor of the battery group 101, the ESL is an equivalent inductor of the battery group 101, and E is a battery package. L2 is an isolation inductor and is configured to isolate the battery heating circuit Part 2 from the motor equivalent load circuit Part 5. Therefore, the reversed voltage of the battery group 101 is absorbed by the isolation inductor L2 and may not be applied to the load follow-up. C2 is a pre-charging capacitor; and R is the equivalent load of the motor. D1 and D2 are diodes for forming corresponding charging/discharging loops. When the battery heater is operational, the internal switch module thereof turns on or off in a certain timing sequence.

Referring to FIGS. 3A-3B, according to one embodiment of the present disclosure, the switch module (e.g., the first switch module 301 or the second switch module 302) may be an insulated gate bipolar transistor (IGBT). When the battery heater 102 starts to work, the internal elements of the battery heater, such as inductors, capacitors are in an initial status and do not store any energy. The operation procedure of the battery heater is described below.

When the IGBT1 is on and the IGBT2 is off, the battery package E charges the first capacitor C1 by the charging loop "E-ESR-ESL-D1-C1-E". After the battery package E has charged the first capacitor C1 for a time period, the voltage of the first capacitor C1 is equal to the voltage of the battery package E. But because there is an inductive element in the battery heater, the first capacitor C1 continues being charged so that the voltage of the first capacitor C1 is higher than that of the battery package. When the charge current is zero, the first capacitor C1 begins to discharge by the discharging loop "C1-D1-ESL-ESR-E-C1" until the discharge current is zero.

When the IGBT1 is off and the IGBT2 is on, the first capacitor C1 continues discharging by the discharging loop "C1-D2-L1-IGBT2-C1". Because there is the first inductor L1, the first capacitor C1 continues to discharge so that the voltage of the first capacitor C1 is lower than that of the battery package E. The above process is thus repeated.

Referring to FIG. 3A, as a corresponding first capacitor C1 (C11, C12, C13 or C14) is chosen, the peak voltage of C11, C12, C13 or C14 in a discharging loop (i.e., heating loop) Part 2 changes, and thus the peak values of the forward current and the reverse current in the heating loop also change. Therefore, the heating power of the battery heater is adjusted. In other words, the larger the capacitance is, the larger the heating power is. Furthermore, changing a duty ratio (i.e., pulse width) of the output pulse of the second switch module 302 may achieve an optimal action time of the forward charging and the reverse charging in the heating loop.

In one embodiment of the present disclosure, the output power adjusting module 1021 is configured to adjust the duty ratios of the output pulses of the first switch module 301 and the second switch module 302 according to an instruction sent by the battery management device 103. The battery management device 103 sends a CAN signal (instruction) to the output power adjusting module 1021 of the battery heater 102 according to the temperature of the battery group 101 (i.e., battery package) so as to make the output power adjusting module 1021 connect with the corresponding first capacitor C1 (e.g., C11, C12, C13 or C14). Meanwhile, according to the corresponding first capacitor C1, the first switch module 301 (i.e., IGBT1) and the second switch module 302 (i.e., IGBT2) is controlled to turn on or turn off with different pulse signals so as to adjust the duty ratios of the output pulses of the first switch module 301 and the second switch module 302, and therefore, the heating power of the battery heater is adjusted to be adapted to a required power to be provided by the battery group 101.

Specifically, as the corresponding first capacitor C1 is chosen (for example, C11, C12, C13 or C14 is chosen), the peak voltage of the first capacitor C1 in the discharging loop (i.e., heating loop) Part 2 changes, and thus the peak values of the forward current and the reverse current in the discharging loop (i.e., heating loop) Part 2 also change. Therefore, the heating power of the battery heater 102 is adjusted. Furthermore, when the corresponding first capacitor C1 (e.g., C11, C12, C13 or C14) is chosen, the timing sequence of turning on and off the first switch module 301 (IGBT1) and the second switch module 302 (IGBT2) needs to be changed.

In other words, the pulse widths of the first switch module 301 (IGBT1) and the second switch module 302 (IGBT2) change with the adjustment of the first capacitor C1 (i.e., the selection of the first capacitor C11, C12, C13 or C14). Referring to FIG. 3A, in one embodiment, the capacitance of the first capacitor C11 is lower than the capacitance of the first capacitor C12, the capacitance of the first capacitor C12 is lower than the capacitance of the first capacitor C13, and the capacitance of the first capacitor C13 is lower than the capacitance of the first capacitor C14. Thus, by using difference capacitors with different capacitances as the first capacitor C1, the heating power of the battery heater 102 is adjusted.

Generally, the lower the temperature of the battery group 101 is, the lower the discharging capability of the battery group 101 is, and the lower the voltage of the battery group 101 is, and thus the lower the output power is. Therefore, it conforms to the discharging characteristic of the battery to choose different heating powers according to the temperature of the battery group 101. Referring to FIG. 3A, when the temperature is very low, the capacitor C11 may be chosen to output a low power.

Referring to FIG. 3B, in another embodiment of the present disclosure, a plurality of first capacitors C1 (C.1, C.2, C.3 and C.4) may be identical. The heating power is adjusted by changing the number of the first capacitors connected with the output power adjusting module 1021. In other words, when there are a plurality of first capacitors C1 in the battery heater 102, the output power adjusting module 1021 adjust the number of the first capacitors connected with the output power adjusting module 1021 according to an instruction sent by the battery management device 103.

Specifically, referring to FIG. 3B, the four capacitors C.1, C.2, C.3 and C.4 are connected in parallel. According to the electrical characteristics of the capacitors, the equivalent capacitance of two capacitors connected in parallel is a sum of the capacitances of the two capacitors. Therefore, provided the capacitances of the four capacitors C.1. C.2, C.3 and C.4 are the same, it can be obtained that:

$$C11=C.1; C12=C.1+C.2; C13=C.1+C.2+C.3; C14=C.1+C.2+C.3+C.4.$$

Therefore, $C14=4*C.1$; $C13=3*C.1$; $C12=2*C.1$; $C11=C.1$.

By changing the number of capacitors connected with the output power adjusting module 1021, the capacitance is changed, and thus the heating power is changed. In one embodiment, the output power adjusting module 1021 may be a relay, as shown in FIG. 3A-3B.

In one embodiment of the present disclosure, the isolation inductor L2 may prevent the pre-charging capacitor C2 from charging the first capacitor C1 through the first switch module 301 so that the current waveform of the first capacitor C1 may be controlled and thus the characteristics of the heating circuit may be controlled. Therefore, the circuit may run normally. As a result, when the motor 105 and the battery heater 102 operate simultaneously, the isolation inductor L2 may be needed.

In one embodiment of the present disclosure, the inductance L of the isolation inductor L2 may be determined according to the formula $T=2\pi\sqrt{LC}$, where T is an equivalent load operational period of the motor 105 and C is the capacitance of the pre-charging capacitor C2. The battery heater 102 needs to control the IGBT module and switch on/off the first switch module 301 or the second switch module 302. Assuming that a switching frequency of the first switch module 301 or the second switch module 302 is t, in order to reduce the influence of the battery heater 102 on the motor controller 106, it may be assumed that a period of a circuit comprising the isolation inductor L2 and the pre-charging capacitor C2 is T. In one embodiment, $T>10t$, thus meeting the design requirements. Therefore, as used herein, the expression "T is an equivalent load operational period of the motor 105" means that T is the period of the circuit comprising the isolation inductor L2 and the pre-charging capacitor C2.

In one embodiment of the present disclosure, the battery heater 102 further includes a power connector configured to connect and fasten a power cable 109 (shown in FIG. 1). The power connector needs to satisfy the requirement of the anti-vortex. When the battery heater 102 is operational, the frequency of the current is changed very quickly, which leads to sharp increase in the temperature of the magnetic material in the power connector, so the magnetic permeability of the power connector needs to low. In one embodiment of the present disclosure, the battery heater 102 further includes a low voltage connector, which is connected and communicates with an external system. The low voltage connector includes a CAN cable 107 configured to connect to the battery management device 103, a self-test signal cable and a failure signal cable.

Referring to FIG. 2 and FIG. 4, in one embodiment of the present disclosure, the isolation inductor L2 is disposed in the battery heater 102. A fuse 401 is also disposed in the battery heater 102. As shown in FIG. 4, the battery heater 102 includes the isolation inductor L2, the fuse 401 and a power supply for the battery heater 102. The battery heater 102 further includes four power connectors, in which two power connectors are connected to the battery group 101 via the power cable 109 and the other two power connectors are connected to the electric distribution box 104 via the power cable 109. In one embodiment of the present disclosure, the power connectors are used in the head end and the tail end of a high voltage cable.

In one embodiment of the present disclosure, the isolation inductor L2 is disposed in the battery heater 102, and when the battery group 101 does not need to be heated, the battery heater 102 may be removed, so that the electric distribution box 104 may be connected directly to the battery group 101. The electric vehicle does not need any battery heater in a high temperature area but needs the battery heater in a low temperature area. Therefore, if the electric vehicle needs to be modified to adapt to different areas, the modification may be small, thus greatly reducing the cost.

Referring to FIG. 1 and FIG. 5, in one embodiment of the present disclosure, the isolation inductor L2 may be disposed in the electric distribution box 104. No matter the isolation inductor L2 is disposed in the battery heater 102 or the electric distribution box 104, the isolation inductor L2 is disposed between the battery group 101 and the electric distribution box 104.

Referring to FIG. 1, the electric distribution box 104 is not connected to the battery heater 102 directly. The battery group 101 includes four power connectors, in which two power connectors are connected to the battery heater 102 via two power cables 109 and the other two power connectors are connected to the electric distribution box 104 via another two power cables 109. In this embodiment, the power system of the electric vehicle further includes a relay 501 configured to select whether the isolation inductor L2 is connected into the circuit, as shown in FIG. 5. The battery heater 102 is connected in parallel with the electric distribution box 104. The fuse 401 is mounted in the battery group 101.

The isolation inductor L2 is disposed in the electric distribution box 104 so that the influence on the electric distribution box 104 by the battery heater 102 may be greatly reduced. Furthermore, when the battery heater 102 is operational, the isolation inductor L2 may be connected into the circuit by the relay 501, and when the battery heater 102 is not operational, the isolation inductor L2 may be disconnected from the circuit by the relay 501.

In one embodiment of the present disclosure, as shown in FIG. 1-2 and FIG. 3A-3B, the power system of the electric vehicle further includes a cooling assembly 110 configured to cool the first switch module 301 and the second switch module 302.

In one embodiment of the present disclosure, the cooling assembly 110 includes: a wind channel arranged in the battery heater 102; and a fan arranged at one end of the wind channel. The fan is used to dissipate heat for the battery heater 102.

In another embodiment of the present disclosure, the cooling assembly 110 includes: a coolant channel arranged in the battery heater 102; a coolant inlet and a coolant outlet arranged in the battery heater 102 respectively. The heat dissipation effect and the sealing performance of the battery heater may be improved by using the coolant to cool the battery heater.

Referring to FIG. 6, the electric distribution box 104 includes: a primary contactor 601 and a pre-charging-contactor 602. The primary contactor 601 is configured to distribute the voltage output by the battery group 101 to power consumption equipment, such as the motor 105 of the electric vehicle. The pre-charging-contactor 602 is connected with the first input terminal 603 or the second input terminal 604 of the motor controller 106, and configured to charge the pre-charging capacitor C2 under the control of the battery management device 103 before the motor controller 106 controls the motor 105 to start.

In one embodiment of the present disclosure, when the residual electric quantity (also named as SOC (state of charge)) of the battery group 101 is larger than a running electric quantity threshold, the electric vehicle is allowed to enter in a running heating mode. The running electric quantity threshold is larger than the parking electric quantity threshold.

The running heating mode means that besides the battery group 101 being heated by the battery heater 102, other high voltage power consumption equipment of the electric vehicle, such as a motor and an air conditioner, may work simultaneously under a limited power. Accordingly, the parking heating mode means that except the battery group 101 being heated by the battery heater 102, the other high voltage power consumption equipment of the electric vehicle such as the motor and the air conditioner does not work. The running electric quantity threshold is a first predetermined residual electric quantity of the battery group when the electric vehicle is allowed to enter in the running heating mode, and the parking electric quantity threshold is a second predetermined residual electric quantity of the battery when the electric vehicle is allowed to enter in the parking heating mode.

Specifically, when any of the following conditions is satisfied, the battery management device 103 controls the battery heater 102 to heat the battery group 101 in the running heating mode:

the temperature of the battery group is higher than a first temperature threshold and lower than a second temperature threshold, and the residual electric quantity of the battery group is larger than a first electric quantity threshold;

the temperature of the battery group is higher than the second temperature threshold and lower than a third temperature threshold, and the residual electric quantity of the battery group is larger than a second electric quantity threshold, while the second electric quantity threshold is lower than the first electric quantity threshold;

the temperature of the battery group is higher than the third temperature threshold and lower than a fourth temperature threshold, and the residual electric quantity of the battery group is larger than a third electric quantity threshold, while the third electric quantity threshold is lower than the second electric quantity threshold; and the temperature of the battery group is higher than the fourth temperature threshold and lower than a fifth temperature threshold and the residual electric quantity of the battery group is larger than a fourth electric quantity threshold, while the fourth electric quantity threshold is lower than the third electric quantity threshold.

In one embodiment of the present disclosure, the first temperature threshold may be −30° C., the second temperature threshold may be −25° C., the third temperature threshold may be −20° C., the fourth temperature threshold may be −15° C., the fifth temperature threshold may be −10° C., the first electric quantity threshold may be 30% of the total electric quantity of the battery group 101, the second electric quantity threshold may be 27.5% of the total electric quantity of the battery group 101, the third electric quantity threshold may be 25% of the total electric quantity of the battery group 101, and the fourth capacity threshold may be 22.5% of the total electric quantity of the battery group 101.

According to one embodiment of the present disclosure, the battery management device 103 judges whether the temperature of the battery group 101 is higher than a sixth temperature threshold. If yes and the residual electric quantity of the battery group 101 is larger than a fifth electric quantity threshold, the battery management device 103 controls the battery heater 102 to heat the battery group 101 in the running heating mode. If no, the battery management device 103 judges whether the temperature of the battery group 101 is higher than a seventh temperature threshold. If yes and the residual electric quantity of the battery group 101 is larger than a sixth electric quantity threshold, the battery management device 103 controls the battery heater 102 to heat the battery group 101 in the running heating mode. If no, the battery management device 103 judges whether the temperature of the battery group 101 is higher than an eighth temperature threshold. If yes and the residual electric quantity of the battery group 101 is larger than a seventh electric quantity threshold, the battery management device 103 controls the battery heater 102 to heat the battery group 101 in the running heating mode. If no, the battery management device 103 judges whether the temperature of the battery group 101 is higher than a ninth temperature threshold. If yes and the residual electric quantity of the battery group 101 is larger than an eighth electric quantity threshold, the battery management device 103 controls the battery heater to heat the battery group 101 in the running heating mode.

The sixth temperature threshold is higher than the seventh temperature threshold, the seventh temperature threshold is higher than the eighth temperature threshold, and the eighth temperature threshold is higher than the ninth temperature threshold. The fifth electric quantity threshold is lower than the sixth capacity threshold, the sixth capacity threshold is lower than the seventh capacity threshold, and the seventh capacity threshold is lower than the eighth capacity threshold.

In one embodiment of the present disclosure, the ninth temperature threshold may be −30° C., the eighth temperature threshold may be −25° C., the seventh temperature threshold may be −20° C., the sixth temperature threshold may be −15° C., the eighth electric quantity threshold may be 30% of the total electric quantity of the battery group 101, the seventh electric quantity threshold may be 27.5% of the total electric quantity of the battery group 101, the sixth electric quantity threshold may be 25% of the total electric quantity of the battery group 101, and the fifth electric quantity threshold may be 22.5% of the total electric quantity of the battery group 101. In one embodiment of the present disclosure, when the residual electric quantity of the battery group 101 is lower than the running electric quantity threshold and larger than the parking electric quantity threshold, the electric vehicle is allowed to enter in the parking heating mode.

Specifically, when any of the following conditions is satisfied, the battery management device 103 controls the battery heater 102 to heat the battery group 101 in the parking heating mode:

The temperature of the battery group 101 is higher than a tenth temperature threshold and lower than an eleventh temperature threshold and the residual electric quantity of the battery group 101 is larger than a ninth electric quantity threshold;

The temperature of the battery group 101 is higher than the eleventh temperature threshold and lower than a twelfth temperature threshold and the residual electric quantity of the battery group 101 is larger than a tenth electric quantity threshold, while the tenth electric quantity threshold is lower than the ninth electric quantity threshold;

The temperature of the battery group 101 is higher than the twelfth temperature threshold and lower than a thirteenth temperature threshold and the residual electric quantity of the battery group 101 is larger than an eleventh electric quantity threshold, while the eleventh electric quantity threshold is lower than the tenth electric quantity threshold; and The temperature of the battery group 101 is higher than the thirteenth temperature threshold and lower than a fourteenth temperature threshold and the residual electric quantity of the battery group 101 is larger than a twelfth electric quantity threshold, while the twelfth electric quantity threshold is lower than the eleventh electric quantity threshold.

In one embodiment, the tenth temperature threshold may be −30° C., the eleventh temperature threshold may be −25° C., the twelfth temperature threshold may be −20° C., the thirteenth temperature threshold may be −15° C., the fourteenth temperature threshold may be −10° C., the ninth electric quantity threshold may be 20% of the total electric quantity of the battery group 101, the tenth electric quantity threshold may be 17.5% of the total electric quantity of the battery group 101, the eleventh electric quantity threshold may be 15% of the total electric quantity of the battery group 101, and the twelfth electric quantity threshold may be 12.5% of the total electric quantity of the battery group 101.

According to one embodiment of the present disclosure, the battery management device 103 judges whether the temperature of the battery group 101 is higher than a fifteenth temperature threshold. If yes and the residual electric quantity of the battery group 101 is larger than a thirteenth electric quantity threshold, the battery management device 103 controls the battery heater 102 to heat the battery group 101 in the parking heating mode. If no, the battery management device 103 judges whether the temperature of the battery group 101 is higher than a sixteenth temperature threshold. If yes and the residual electric quantity of the battery group 101 is larger than a fourteenth electric quantity threshold, the battery management device 103 controls the battery heater 102 to heat the battery group 101 in the parking heating mode. If no, the battery management device 103 judges whether the temperature of the battery group is higher than a seventeenth temperature threshold. If yes and the residual electric quantity of the battery group 101 is larger than a fifteenth electric quantity threshold, the battery management device 103 controls the battery heater 102 to heat the battery group 101 in the parking heating mode. If no, the battery management device 103 judges whether the temperature of the battery group is higher than an eighteenth temperature threshold. If yes and the residual electric quantity of the battery group 101 is larger than a sixteenth electric quantity threshold, the battery management device 103 controls the battery heater 102 to heat the battery group 101 in the parking heating mode.

The fifteenth temperature threshold is higher than the sixteenth temperature threshold, the sixteenth temperature threshold is higher than the seventeenth temperature threshold, and the seventeenth temperature threshold is higher than the eighteenth temperature threshold. The thirteenth electric quantity threshold is lower than the fourteenth electric quantity threshold, the fourteenth electric quantity threshold is lower than the fifteenth electric quantity threshold, and the fifteenth electric quantity threshold is lower than the sixteenth electric quantity threshold.

In one embodiment, the eighteenth temperature threshold may be −30° C., the seventeenth temperature threshold may be −25° C., the sixteenth temperature threshold may be −20° C., the fifteenth temperature threshold may be −15° C., the sixteenth electric quantity threshold may be 20% of the total electric quantity of the battery group 101, the fifteenth electric quantity threshold may be 17.5% of the total electric quantity of the battery group 101, the fourteenth electric quantity threshold may be 15% of the total electric quantity of the battery group 101, and the thirteenth electric quantity threshold may be 12.5% of the total electric quantity of the battery group 101.

According to some embodiments of the present disclosure, the battery management device 103 may control the battery heater 102 to heat the battery group 101 in the running heating mode or in the parking heating mode according to the temperature and residual electric quantity of the battery group 101. The control accuracy of the battery management device 103 is higher and it is easier to achieve the control procedure.

In one embodiment of the present disclosure, the power system further comprises a heating button connected with the battery management device 103. When the heating button is pressed, the battery management device 103 sends a heating signal to the battery heater 102 to control the battery heater 102 to heat the battery group 101. The battery management device 103 is further configured to: after controlling the battery heater 102 to heat the battery group 101, if the heating button is pressed again, judge whether the operation of pressing the button satisfies a preset condition (i.e., judge whether the heating button is pressed and held for a preset time). If yes, control the electric vehicle and/or the battery heater 102 according to the temperature and the residual electric quantity of the battery group 101.

Specifically, if the temperature of the battery group 101 is lower than a nineteenth temperature threshold, the battery management device 103 indicates to inhibit the electric vehicle from being heated, driven or charged; and if the temperature of the battery group 101 is higher than the nineteenth temperature threshold, the battery management device 103 further judges whether the residual electric quantity of the battery group 101 is larger than a seventeenth electric quantity threshold.

Specifically, if the residual electric quantity of the battery group 101 is lower than the seventeenth electric quantity threshold and the temperature of the battery group 101 is higher than the nineteenth temperature threshold, the battery management device 103 indicates to inhibit the electric vehicle from being heated, driven or charged; and if the residual electric quantity of the battery group 101 is larger than the seventeenth electric quantity threshold and the temperature of the battery group 101 is higher than the nineteenth temperature threshold, the battery management device 103 allows the electric vehicle to run under a limited power.

In one embodiment of the present disclosure, the nineteenth temperature threshold may be −20° C., and the seventeenth electric quantity threshold may be 25% of the total electric quantity of the battery group 101.

In one embodiment of the present disclosure, the battery management device 103 is further configured to adjust the output power of the battery heater 102 according to the real time temperature of the battery group 101 to heat the battery group 101 by different heating procedures. Specifically, when the temperature of the battery group 101 is higher than a third heating threshold and lower than a fourth heating threshold, the battery management device 103 controls the battery heater 102 to heat the battery group 101 with a first power.

When the temperature of the battery group 101 is higher than a fourth heating threshold and lower than a fifth heating threshold, the battery management device 103 controls the battery heater 102 to heat the battery group 101 with a second power, in which the second power is lower than the first power. When the temperature of the battery group 101 is higher than a fifth heating threshold and lower than a sixth heating threshold, the battery management device 103 controls the battery heater 102 to heat the battery group 101 with a third power, in which the third power is lower the second power; or when the temperature of the battery group 101 is higher than a sixth heating threshold and lower than a seventh heating threshold, the battery management device 103 controls the battery heater 102 to heat the battery group 101 with a fourth power, in which the fourth power is lower than the third power.

In one embodiment of the present disclosure, the third heating threshold may be −30° C., the fourth heating threshold may be −25° C., the fifth heating threshold may be −20° C., the sixth heating threshold may be −15° C., and the seventh heating threshold may be −10° C.

In one embodiment of the present disclosure, the battery management device 103 is further configured to judge whether the heating time reaches a first preset time T1 and to control the battery heater 102 to suspend heating the battery group 101 when the heating time reaches the first preset time period. In one embodiment of the present disclosure, after controlling the battery heater 102 to suspend heating the battery group 101, the battery management device 103 is further configured to calculate a suspension time and control the battery heater 102 to heat the battery group 101 when the suspension time reaches a second preset time period T2.

With the power system of the electric vehicle of the present disclosure, by using the battery group to discharge with large current and by the heating of the internal resistor of the battery group, the battery group may be heated. Without any external power supply, the electricity for heating is totally provided by the battery group. A heating management may be performed for the battery group by the battery management device and the battery heater, which may greatly reduce the restriction on the use of the electric vehicle at the low temperature and satisfy the requirement of running and charging at the low temperature. That is, the battery group may be heated while the electric vehicle may run in the limited power. Moreover, the power system of the electric vehicle heats the battery group directly, and therefore, a higher heating efficiency, a lower cost and a better utility may be achieved.

In one embodiment of the present disclosure, an electric vehicle is provided. The electric vehicle comprises the power system of the electric vehicle mentioned above. The electric vehicle may run in a low temperature environment, and the electric vehicle may run while the battery group may be heated, thus ensuring a safe and smooth running.

In the following, a method for heating a battery group of an electric vehicle is described in detail with reference to FIG. 7-11. In FIG. 7-11, the detailed values (such as, −10° C.) are only illustrative to explain various thresholds (such as the first heating threshold), but not used to limit the scope of the present disclosure. The values of various thresholds may be changed according to actual conditions, which is obvious for a person skilled in the art. Furthermore, the executing orders of the steps in FIG. 7-11 are only illustrative and exemplary, but not used to limit the scope of the present disclosure. The executing order of the steps may be changed according to actual conditions, which is also obvious for a person skilled in the art.

Referring to FIG. 11, a method for heating a battery group of an electric vehicle is provided. The method comprises the following steps.

At step S1101, a temperature and a residual electric quantity of the battery group are detected.

At step S1102, if the temperature of the battery group is lower than a first heating threshold and the residual electric quantity of the battery group is larger than a parking electric quantity threshold, a heating power of a battery heater is adjusted to heat the battery group according to the temperature of the battery group.

At step S1103, if the temperature of the battery group is lower than the first heating threshold and the residual electric quantity of the battery group is lower than the parking electric quantity threshold, the battery group is inhibited from being heated or charged and the electric vehicle is inhibited from being driven.

According to an embodiment of the present disclosure, referring to FIG. 7, specifically, the method for heating the battery group of the electric vehicle may comprise the following steps.

At step S701, the electric vehicle is powered on.

At step S702, it is detected whether the temperature of the battery group is lower than the first heating threshold. If no, step S703 is followed; if yes, the electric quantity of the battery group needs to be detected and then step S704 is followed.

At step S703, the battery management device controls the primary contactor in the electric distribution box to be switched on. Before switching on the primary contactor, the battery management device controls the pre-charging-contactor to be switched on, and after the pre-charging is finished, the primary contactor is switched on.

At step S704, the battery management device judges whether the heating and running condition is satisfied according to the temperature and the residual electric quantity of the battery group. Specifically, when the residual electric quantity of the battery group is larger than the running electric quantity threshold, the electric vehicle is allowed to enter in the running heating mode; and when the residual electric quantity of the battery group is lower than the running electric quantity threshold but larger than the parking electric quantity threshold, the electric vehicle is allowed to enter in the parking heating mode. The running electric quantity threshold is larger than the parking electric quantity threshold.

At step S705, it is judged whether the heating is in the running heating mode. If yes, step S706 is followed, and if no, step S707 is followed.

At step S706, when the temperature of the battery group is lower than the first temperature threshold, the battery management device sends a message to a meter to display that the temperature of the battery group is too low so that the electric vehicle is not allowed to be heated, driven or charged.

When the temperature of the battery group is higher than the first temperature threshold and lower than the second temperature threshold, if the residual electric quantity of the battery group is larger than the first electric quantity threshold, the battery management device controls the battery heater to heat the battery group, and step S710 is followed; and if the residual electric quantity of the battery group is lower than the first electric quantity threshold, step S709 is followed.

When the temperature of the battery group is larger than the second temperature threshold and lower than the third temperature threshold, if the residual electric quantity of the battery group is larger than the second electric quantity threshold, the battery management device controls the battery heater to heat the battery group, and step S710 is followed; and if the residual electric quantity of the battery group is lower than the second electric quantity threshold, step S709 is followed, in which the second electric quantity threshold is lower than the first electric quantity threshold.

When the temperature of the battery group is higher than the third temperature threshold and lower than the fourth temperature threshold, if the residual electric quantity of the battery group is larger than the third electric quantity threshold, the battery management device controls the battery heater to heat the battery group, and step S710 is followed; and if the residual electric quantity of the battery group is lower than the third electric quantity threshold, step S709 is followed, in which the third electric quantity threshold is lower than the second electric quantity threshold.

When the temperature of the battery group is higher than the fourth temperature threshold and lower than the fifth temperature threshold, if the residual electric quantity of the battery group is larger than the fourth electric quantity threshold, the battery management device controls the battery heater to heat the battery group, and step S710 is followed; and if the residual electric quantity of the battery group is lower than the fourth electric quantity threshold, step S709 is followed, in which the fourth electric quantity threshold is lower than the third electric quantity threshold.

At step S707, the battery heater heats the battery group in the parking heating mode.

At step S708, when the temperature of the battery group is lower than the tenth temperature threshold, the battery management device sends a message to the meter to display that the temperature of the battery group is too low so that the electric vehicle is not allowed to be heated, driven or charged.

When the temperature of the battery group is higher than the tenth temperature threshold and lower than the eleventh temperature threshold, if the residual electric quantity of the battery group is larger than the ninth electric quantity threshold, the battery management device controls the battery heater to heat the battery group, and step S710 is followed; and if the residual electric quantity of the battery group is lower than the ninth electric quantity threshold, step S709 is followed.

When the temperature of the battery group is higher than the eleventh temperature threshold and lower than the twelfth temperature threshold, if the residual electric quantity of the battery group is larger than the tenth electric quantity threshold, the battery management device controls the battery heater to heat the battery group, and step S710 is followed; and if the residual electric quantity of the battery group is lower than the tenth electric quantity threshold, step S709 is followed, in which the tenth electric quantity threshold is lower than the ninth electric quantity threshold.

When the temperature of the battery group is higher than the twelfth temperature threshold and lower than the thirteenth temperature threshold, if the residual electric quantity of the battery group is larger than the eleventh electric quantity threshold, the battery management device controls the battery heater to heat the battery group, and step S710 is followed; and if the residual electric quantity of the battery group is lower than the eleventh electric quantity threshold, step S709 is followed, in which the eleventh electric quantity threshold is lower than the tenth electric quantity threshold.

When the temperature of the battery group is higher than the thirteenth temperature threshold and lower than the fourteenth temperature threshold, if the residual electric quantity of the battery group is larger than the twelfth electric quantity threshold, the battery management device controls the battery heater to heat the battery group, and step S710 is followed; and if the residual electric quantity of the battery group is lower than the twelfth electric quantity threshold, step S709 is followed, in which the twelfth electric quantity threshold is lower than the eleventh electric quantity threshold.

At step S709, the battery management device sends a message to the meter to display that the residual electric quantity of the battery group is too low so that the electric vehicle is not allowed to be heated, driven or charged.

At step S710, the battery heater performs a self-test to detect whether there is a failure. If yes, step S712 is followed; and if no, step S711 is followed.

At step S711, the battery heater heats the battery group, and during the heating process, step S713 is also performed.

At step S712, the electric vehicle is not allowed to be heated, driven or charged.

At step S713, the battery heater performs a self-test to detect whether there is a failure. If yes, step S715 is followed; and if no, step S714 is followed.

At step S714, it is judged whether the heating is finished. If yes, step S716 is followed; and if no, step S711 is followed.

At step S715, the battery heater stops heating the battery group.

At step S716, a CAN message is sent to the battery heater to make the battery heater stop heating the battery group.

In one embodiment of the present disclosure, referring to FIG. 7, the first heating threshold may be −10° C., the first temperature threshold may be −30° C., the second temperature threshold may be −25° C., the third temperature threshold may be −20° C., the fourth temperature threshold may be −15° C., the fifth temperature threshold may be −10° C. the first electric quantity threshold may be 30% of the total electric quantity of the battery group, the second electric quantity threshold may be 27.5% of the total electric quantity of the battery group, the third electric quantity threshold may be 25% of the total electric quantity of the battery group, the fourth electric quantity threshold may be 22.5% of the total electric quantity of the battery group, the tenth temperature threshold may be −30° C., the eleventh temperature threshold may be −25° C., the twelfth temperature threshold may be −20° C., the thirteenth temperature threshold may be −15° C., the fourteenth temperature threshold may be −10° C., the ninth electric quantity threshold may be 20% of the total electric quantity of the battery group, the tenth electric quantity threshold may be 17.5% of the total electric quantity of the battery group, the eleventh electric quantity threshold may be 15% of the total electric quantity of the battery group, and the twelfth electric quantity threshold may be 12.5% of the total electric quantity of the battery group.

According to an embodiment of the present disclosure, referring to FIG. 8, specifically, the method for heating the battery group of the electric vehicle may comprise the following steps.

At step S801, the electric vehicle is powered on.

At step S802, it is detected whether the temperature of the battery group is lower than the first heating threshold. If no, step S803 is followed; if yes, the electric quantity of the battery group needs to be detected and then step S804 is followed.

At step S803, the battery management device controls the primary contactor in the electric distribution box to be switched on. Before switching on the primary contactor, the battery management device controls the pre-charging-contactor to be switched on, and after the pre-charging is finished, the primary contactor is switched on.

At step S804, the battery management device judges whether the heating and running condition is satisfied according to the temperature and the residual electric quantity of the battery group. Specifically, when the residual electric quantity of the battery group is larger than the running electric quantity threshold, the electric vehicle is allowed to enter in the running heating mode, and when the residual electric quantity of the battery group is lower than the running electric quantity threshold but larger than the parking electric quantity threshold, the electric vehicle is allowed to enter in the parking heating mode. The running electric quantity threshold is larger than the parking electric quantity threshold.

At step S805, it is judged whether the healing is in the running heating mode. If yes, step S806 is followed, and if no, step S807 is followed.

At step S806, the battery management device judges whether the temperature of the battery group is higher than the sixth temperature threshold. If yes and if the residual electric quantity of the battery group is larger than the fifth electric quantity threshold, step S810 is followed, and if the residual electric quantity of the battery group is lower than the fifth electric quantity threshold, step S809 is followed. If no, the battery management device further judges whether the temperature of the battery group is larger than the seventh temperature threshold.

If yes and the residual electric quantity of the battery group is larger than the sixth electric quantity threshold, step S810 is followed, and if the residual electric quantity of the battery group is lower than the sixth electric quantity threshold, step S809 is followed. If no, the battery management device further judges whether the temperature of the battery group is higher than the eighth temperature threshold.

If yes and the residual electric quantity of the battery group is larger than the seventh electric quantity threshold, step S810 is followed, and if the residual electric quantity of the battery group is lower than the seventh electric quantity threshold, step S809 is followed. If no, the battery management device judges whether the temperature of the battery group is larger than the ninth temperature threshold.

If yes and the residual electric quantity of the battery group is larger than the eighth electric quantity threshold, step S810 is followed, and if the residual electric quantity of the battery group is lower than the eighth electric quantity threshold, step S809 is followed. If no, the battery management device sends a message to the meter to display that the temperature of the battery group is too low so that the electric vehicle is not allowed to be heated, driven or charged.

The sixth temperature threshold is higher than the seventh temperature threshold, the seventh temperature threshold is higher than the eighth temperature threshold, and the eighth temperature threshold is higher than the ninth temperature threshold. The fifth electric quantity threshold is lower than the sixth electric quantity threshold, the sixth electric quantity threshold is lower than the seventh electric quantity threshold, and the seventh electric quantity threshold is lower than the eighth electric quantity threshold.

At step S807, the battery heater heats the battery group in the parking heating mode.

At step S808, the battery management device judges whether the temperature of the battery group is higher than the fifteenth temperature threshold. If yes and the residual electric quantity of the battery group is larger than the thirteenth electric quantity threshold, step S810 is followed, and if the residual electric quantity of the battery group is lower than the thirteenth electric quantity threshold, step S809 is followed. If no, the battery management device further judges whether the temperature of the battery group is higher than the sixteenth temperature threshold.

If yes and the residual electric quantity of the battery group is larger than the fourteenth electric quantity threshold, step S810 is followed, and if the residual electric quantity of the battery group is lower than a fourteenth electric quantity threshold, step S809 is followed. If no, the battery management device further judges whether the temperature of the battery group is higher than the seventeenth temperature threshold.

If yes and the residual electric quantity of the battery group is larger than the fifteenth electric quantity threshold, step S810 is followed, and if the residual electric quantity of the battery group is lower than the fifteenth electric quantity threshold, step S809 is followed. If no, the battery management device further judges whether the temperature of the battery group is higher than the eighteenth temperature threshold.

If yes and the residual electric quantity of the battery group is larger than the sixteenth electric quantity threshold, step S810 is followed, and if the residual electric quantity of the battery group is lower than the sixteenth electric quantity threshold, step S809 is followed. If no, the battery management device sends a message to the meter to display that the temperature of the battery group is too low so that the electric vehicle is not allowed to be heated, driven or charged.

The fifteenth temperature threshold is larger than the sixteenth temperature threshold, the sixteenth temperature threshold is larger than the seventeenth temperature threshold, and the seventeenth temperature threshold is larger than the eighteenth temperature threshold. The thirteenth electric quantity threshold is lower than the fourteenth electric quantity threshold, the fourteenth electric quantity threshold is lower than the fifteenth electric quantity threshold, and the fifteenth electric quantity threshold is lower than the sixteenth electric quantity threshold.

At step S809, the battery management device sends a message to the meter to display that the residual electric quantity of the battery group is too low so that the electric vehicle is not allowed to be heated, driven or charged.

At step S810, before heating, the battery heater performs a self-test to detect whether there is a failure. If yes, step S812 is followed, and if no, step S811 is followed.

At step S811, the battery heater heats the battery group, and during the heating process, step S813 is also performed.

At step S812, the electric vehicle is not allowed to be heated, driven or charged.

At step S813, the battery heater performs a self-test to detect whether there is a failure. If yes, step S815 is followed, and if no, step S814 is followed.

At step S814, it is judged whether the heating is finished. If yes, step S816 is followed, and if no, step S811 is followed.

At step S815, the battery heater stops heating the battery group.

At step S816, a CAN message is sent to the battery heater to make the battery heater stop heating the battery group.

In one embodiment, referring to FIG. 8, the first heating temperature threshold may be −10° C., the ninth temperature threshold may be −30° C., the eighth temperature threshold may be −25° C., the seventh temperature threshold may be −20° C., the sixth temperature threshold may be −15° C., the eighth electric quantity threshold may be 30% of the total electric quantity of the battery group, the seventh electric quantity threshold may be 27.5% of the total electric quantity of the battery group, and the sixth electric quantity threshold may be 25% of the total electric quantity of the battery group, the fifth electric quantity threshold may be 22.5% of the total electric quantity of the battery group, the eighteenth temperature threshold may be −30° C., the seventeenth temperature threshold may be −25° C., the sixteenth temperature threshold may be −20° C., the fifteenth temperature threshold may be −15° C., the sixteenth electric quantity threshold may be 20% of the total electric quantity of the battery group, the fifteenth electric quantity threshold may be 17.5% of the total electric quantity of the battery group, and the fourteenth electric quantity threshold may be 15% of the total electric quantity of the battery group, and the thirteenth electric quantity threshold may be 12.5% of the total electric quantity of the battery group.

According to an embodiment of the present disclosure, referring to FIG. 9, the method for heating the battery group of the electric vehicle may comprise the following steps.

At step S901, the electric vehicle is powered on.

At step S902, the temperature and the residual electric quantity of the battery group are detected.

At step S903, it is judged whether the temperature of the battery group is lower than the first heating threshold, if yes, step S905 is followed, and if no, step S904 is followed.

At step S904, the battery management device controls the pre-charging-contactor to be switched on, and after the pre-charging is finished, the primary contactor is switched on. The electric vehicle runs normally. Specifically, the battery management device controls the pre-charging-contactor in the electric distribution box to be switched on to charge the pre-charging-capacitor and controls the pre-charging-contactor to be switched off after the pre-charging is finished.

At step S905, the battery management device calculates whether the residual electric quantity of the battery group is larger than the running electric quantity threshold. If yes, step S907 is followed, and if no, step S906 is followed.

At step S906, the battery management device calculates whether the residual electric quantity of the battery group is larger than the parking electric quantity threshold, if yes, step S907 is followed, and if no, step S908 is followed. The running electric quantity threshold is larger than the parking electric quantity threshold.

At step S907, a user confirms whether the battery group needs to be heated, if yes, step S909 is followed, and if no, step S910 is followed.

At step S908, the battery management device sends a message to the meter to display that the residual electric quantity of the battery group is too low so that the electric vehicle is not allowed to be heated, driven or charged.

At step S909, the battery heater performs a self-test to detect whether there is a failure. If yes, step S91 is followed, and if no, step S912 is followed.

At step S910, the battery management device sends a message to the meter to display that the electric vehicle is not allowed to be heated, driven or charged.

At step S911, the battery management device stops supplying power and sending a message to the battery heater, and sends a message to the meter to display that there is a failure in the battery heater so that the electric vehicle is not allowed to be heated, driven or charged.

At step S912, the battery management device sends a heating signal to the battery heater to heat the battery group.

At step S913, the battery management device controls the pre-charging-contactor to be switched on, and after the pre-charging is finished, the primary contactor is switched on and then the battery group is heated, while the battery heater keeps on performing a self-test. Specifically, the battery management device calculates the current temperature and the current residual electric quantity of the battery group, calculates the maximum output power of the battery group according to the current temperature and the current residual electric quantity of the battery group, and controls the electric vehicle to run under a limited power according to the maximum output power.

At step S914, it is judged whether the heating button is pressed and held for a preset time. If yes, step S915 is followed, and if no, step S920 is followed. In this embodiment, the preset time may be 2 seconds.

At step S915, it is judged whether the temperature of the battery group is lower than the nineteenth temperature threshold. If yes, step S916 is followed, and if no, step S917 is followed.

At step S916, the electric vehicle is not allowed to be heated, driven or charged.

At step S917, it is judged whether the residual electric quantity of the battery group is larger than the seventeenth electric quantity threshold. If yes, step S918 is followed, and if no, step S919 is followed.

At step S918, the electric vehicle is allowed to run under a limited power.

At step S919, the battery management device sends a message to the meter to prompt that the user stops heating so that the electric vehicle is not allowed to be heated, driven or charged.

At step S920, it is detected whether there is a failure in the battery heater. If yes, step S921 is followed, and if no, step S922 is followed.

At step S921, the battery heater stops working and the meter displays an alarm so that the electric vehicle is not allowed to be heated, driven or charged.

At step S922, it is detected whether the temperature of the battery group is higher than the first heating threshold. If yes, step S925 is followed, and if no, step S923 is followed.

At step S923, it is detected whether the temperature of any single battery in the battery group is higher than the second heating threshold. If yes, step S925 is followed, and if no, step S924 is followed.

At step S924, it is detected whether the continuous heating time is higher than a heating time threshold. If yes, step S925 is followed, and if no, step S913 is followed.

At step S925, the heating is finished and the battery heater stops operating.

In one embodiment of the present disclosure, the first heating threshold may be −10° C., the second heating threshold may be 20° C., the nineteenth temperature threshold may be −20° C., the seventeenth electric quantity threshold may be 25% of the total electric quantity of the battery group, and the heating time threshold may be 20 minutes.

According to an embodiment of the present disclosure, referring to FIG. 10, the method for heating the battery group of the electric vehicle may comprise the following steps.

At step S1001, the electric vehicle is powered on.

At step S1002, the temperature and the residual electric quantity of the battery group are detected.

At step S1003, it is judged whether the temperature of the battery group is lower than the first heating threshold. If yes, step S1005 is followed, and if no, step S1004 is followed.

At step S1004, the battery management device controls the pre-charging-contactor to be switched on, and after the pre-charging is finished, the primary contactor is switched on. The electric vehicle runs normally.

At step S1005, the battery management device calculates whether the residual electric quantity of the battery group is larger than the running electric quantity threshold. If yes, step S1008 is followed, and if no, step S1006 is followed.

At step S1006, the battery management device calculates whether the residual electric quantity of the battery group is larger than the parking electric quantity threshold. If yes, step S1008 is followed, and if no, step S1007 is followed. The running electric quantity threshold is larger than the parking electric quantity threshold.

At step S1007, the battery management device sends a message to the meter to display that the residual electric quantity of the battery group is too low so that the electric vehicle is not allowed to be heated, driven or charged.

At step S1008, the user confirms whether the battery group needs to be heated. If yes, step S1009 is followed, and if no, step S1010 is followed.

At step S1009, the battery heater performs a self-test to detect whether there is a failure, if yes, step S1011 is followed, and if no, step S1012 is followed.

At step S1010, the battery management device sends a message to the meter to display that the electric vehicle is not allowed to be heated, driven or charged.

At step S1011, the battery management device stops supplying power and sending a message to the battery heater, and sends a message to the meter to display that there is a failure in the battery heater so that the electric vehicle is not allowed to be heated, driven or charged.

At step S1012, the battery management device sends a heating signal to the battery heater to heat the battery group.

At step S1013, the battery management device controls the pre-charging-contactor to be switched on, and after the pre-charging is finished, the primary contactor is switched on and then the battery group is heated, while the battery heater keeps on performing a self-test. Specifically, the battery management device calculates the current temperature and the current residual electric quantity of the battery group, calculates the maximum output power of the battery group according to the current temperature and the current residual electric quantity of the battery group, and controls the electric vehicle to run under a limited power according to the maximum output power.

At step S1014, the temperature of the battery group is detected.

At step S1015, when the temperature of the battery group is higher than the third heating threshold and lower than the fourth heating threshold, the battery management device controls the battery heater to heat the battery group with the first power. When the temperature of the battery group is higher than the fourth heating threshold and lower than the fifth heating threshold, the battery management device controls the battery heater to heat the battery group with the second power, in which the second power is lower than the first power.

When the temperature of the battery group is higher than the fifth heating threshold and lower than the sixth heating threshold, the battery management device controls the battery heater to heat the battery group with the third power, in which the third power is lower than the second power; or when the temperature of the battery group is higher than the sixth heating threshold and lower than the seventh heating threshold, the battery management device controls the battery heater to heat the battery group with the fourth power, in which the fourth power is lower than the third power.

At step S1016, the battery management device judges whether the heating time reaches the first preset time period T1. If yes, step S1017 is followed, and if no, step S1018 is followed.

At step S1017, the battery heater suspends working and the battery management device judges whether the suspension time reaches a second preset time period T2. If yes, step S1016 is followed, and if no, step S1017 is followed.

At step S1018, it is judged whether the heating button is pressed and held for a preset time period. If yes, step S1019 is followed, and if no, step S1020 is followed. In one embodiment, the preset time period may be 2 seconds.

At step S1019, the battery management device sends a message to the meter to prompt that the user stops heating so that the electric vehicle is not allowed to be heated, driven or charged.

At step S1020, it is detected whether there is a failure in the battery heater. If yes, step S1021 is followed, and if no, step S1022 is followed.

At step S1021, the battery heater stops working and the meter displays an alarm so that the electric vehicle is not allowed to be heated, driven or charged.

At step S1022, it is detected whether the temperature of the battery group is higher than the first heating threshold. If yes, step S1025 is followed, and if no, step S1023 is followed.

At step S1023, it is detected whether the temperature of any single battery in the battery group is higher than the second heating threshold. If yes, step S1025 is followed, and if no, step S1024 is followed.

At step S1024, it is detected whether the continuous heating time is larger than the heating time threshold. If yes, step S1025 is followed, and if no, step S1013 is followed.

At step S1025, the heating is finished and the battery heater stops operating.

In one embodiment of the present disclosure, the third heating threshold may be −30° C., the fourth heating threshold may be −25° C., the fifth heating threshold may be −20° C., the sixth heating threshold may be −15° C., the seventh heating threshold may be −10° C., the first heating threshold may be −10° C., the second heating threshold may be 20° C., and the heating time threshold may be 20 minutes.

In some embodiments, when the electric vehicle is powered on, the battery management device detects the temperature of the battery group and the status of the primary contactor. The temperature of the battery group is an average of temperatures of all single batteries in the battery group. The battery management device samples the temperature of each single battery in the battery group through an information collector and calculates the temperature of the battery group.

If the temperature of the battery group is lower than the first heating temperature and the residual electric quantity of the battery group is larger than the parking electric quantity threshold, the user presses and holds the heating button for 2 seconds, and then the battery management device sends a message to the battery heater through the CAN cable to allow the battery group to be heated. Before heating the battery group in the running heating mode, that is, before the motor works, the battery management device sends the control signal to the electric distribution box to control the pre-charging-contactor to be switched on so that the battery group charges the pre-charging capacitor C2. When the voltage of the pre-charging capacitor C2 is substantially equal to that of the battery group, the motor is allowed to work.

In one embodiment of the present disclosure, the heating button is disposed on the meter. Provided that the temperature of the battery group is lower than the first heating threshold and the residual electric quantity of the battery group is larger than the parking electric quantity threshold, when the heating button is pressed, the battery heater is allowed to work. If the heating button is pressed again and held for 2 seconds, the battery heater is forced to stop operating.

The primary contactor is disposed in the electric distribution box and configured to connect the motor controller to a power supply or disconnect the motor controller from a power supply. When the residual electric quantity of the battery group is larger than the running electric quantity threshold, the battery management device sends the control signal to the electric distribution box to control the primary contactor to be switched on so that the motor is allowed to work. The motor controller converts the DC to the three-phase AC required by the motor through the driving circuit, to supply power to the motor and to allow the electric vehicle to run under a limited power.

The pre-charging-contactor is also disposed in the electric distribution box and connected to the pre-charging capacitor C2 in series. In particular, the pre-charging capacitor C2 is charged before the motor works. The reasons may be as follows.

In one aspect, an electrical current shock may be avoided in the pre-charging procedure and an agglomeration caused when the primary contactor is switched on may be avoided. A current limiting resistor is connected in series between the pre-charging capacitor and the pre-charging-contactor. When the pre-charging is finished, the battery management device controls the primary contactor to be switched on and then controls the pre-charging-contactor to be switched off.

In another aspect, since the current is larger at the start moment of the motor, the voltage of the whole battery group is reduced. Therefore, the pre-charging capacitor C2 is charged firstly until the voltage thereof is substantially equal to that of the battery group, and then the motor is started. Because the voltage of the pre-charging capacitor cannot change suddenly, by connecting the pre-charging capacitor and the motor in parallel, the impact on the voltage of the battery group resulting from the start of the motor may be decreased.

When the battery heater receives the heating signal sent by the battery management device, the battery heater performs a self-test to detect whether there is a failure in the battery heater. In one embodiment of the present disclosure, the battery heater sends a single pulse of 0.5 ms to detect whether there is a failure in the battery heater. If there is not any failure, the battery heater sends a control pulse (for example with a cycle of 20 ms and a duty ratio of 20%) to the internal switch module to make the battery group short the circuit in a short time. So the heating purpose is achieved. Meanwhile, the battery heater sends a CAN signal to the meter. The meter receives the CAN signal and displays that "the battery group is being heated".

When the battery group is heated, the battery management device and the battery heater keep on detecting the status of the battery group. If the temperature of the battery group is higher than the first heating threshold, or the continuous heating time is larger than the heating time duration threshold, or the maximum temperature of a single battery in the battery group is higher than the second heating threshold, the battery heater stops sending the control pulse to the internal switch module to stop heating the battery group.

Further, the battery heater sends a CAN signal to the meter. The meter receives the CAN signal and displays that "the heating is finished". Thus, the heating procedure is completed. In one embodiment of the present disclosure, the second heating threshold may be 20° C., and the heating time threshold may the 20 minutes. Preferably, in order to avoid a repeated start of the heating procedure, during the heating process, if the temperature of the battery group is detected to be higher than the first heating threshold by 5° C., the battery group is stopped from being heated.

If the temperature of the battery group is higher than the first heating threshold, the battery management device works normally. If the temperature of the battery group is lower than the first heating threshold and the residual electric quantity of the battery group is less than the parking electric quantity threshold, the primary contactor is not switched on and the battery management device sends the CAN signal to the battery heater and the meter, so that the battery group is not allowed to be heated. When the meter receives the CAN signal, the meter displays that "the residual electric quantity of the battery group is not enough" so that the electric vehicle is not allowed to be heated, driven or charged.

If a failure of the battery heater, including under voltage protection, over-voltage protection, overheat protection, pulse width interval protection or maximum turn-on time protection, appears during the self-test process, it is not allowed to heat the battery group. The battery heater sends a failure signal. The meter receives the failure signal and displays that "a failure in the battery heater". The heating is not allowed.

If any failure of the battery heater, including under voltage protection, over-voltage protection, overheat protection, pulse width interval protection or maximum turn-on time protection, appears during the heating process, the battery heater stops heating the battery group and sends a failure signal. The meter receives the failure signal and displays that "a failure in the battery heater". The heating is ceased.

In some embodiments of the present disclosure, the battery heater comprises a protection circuit to prevent the failures mentioned above. The protection circuit is described in detail as follows.

(1) When there is a failure signal, an IGBT in the battery heater is turned off. An ERROR (failure) pin of the protection circuit is set at a low level, and a failure signal is outputted through an optical coupler. Thus an ERROUT (failure output) pin is at the low level. To release the protection status, the PWM (pulse width modulation) wave should be maintained at a high level for 2 seconds, and then the failure signal is reset and the protection circuit is recovered to a normal status. If the failure signal cannot be reset by the PWM wave in 2 seconds, a permanent error occurs in the protection circuit so that the protection circuit cannot work normally.

(2) To ensure a normal work of a discharge module of the IGBT, the frequency of the pulse sent by a DSP (digital signal processor) may not be too high and the pulse width may not be too long. For example, a maximum pulse width may be 5 ms and a minimum interval may be 7-10 ms, or else a failure signal may be outputted.

(3) In one embodiment of the present disclosure, a DC-DC isolation power supply is used to drive the IGBT. The positive bias voltage for the gate terminal of the IGBT may be +15V, and the negative bias voltage for the gate terminal of the IGBT may be −7V. The negative bias voltage for the gate terminal of IGBT may turn off the IGBT quickly and avoid a malfunction of turning on IGBT because of the overlarge surge current.

(4) In one embodiment of the present disclosure, the protection circuit comprises an under voltage protection circuit. The under voltage protection circuit may avoid an increase in the power consumption of the IGBT caused by the deficient driving voltage. When the driving voltage decreases to a first voltage threshold, the under voltage protection circuit starts to work. In one embodiment of the present disclosure, the first voltage threshold may be 9V.

(5) The over-heat protection circuit may avoid the damage to the IGBT caused by the high temperature. The protection circuit samples the temperature by using a thermistor. When the temperature of the IGBT is higher than a safe temperature threshold, the over-heat protection circuit starts to work. The protection circuit may also be configured to detect whether there is an open circuit in the thermistor. When there is an open circuit in the thermistor, the equivalent impedance is infinite and a protection signal is outputted. In one embodiment of the present disclosure, the safe temperature threshold may be 85° C.

(6) Because there is a large inductance in the discharge loop, when the IGBT is turned off, an over-high voltage may be excited by the collector terminal of the IGBT. So a high voltage capacitor is connected in parallel between the collector terminal and the emitter terminal of the IGBT. The over-voltage protection circuit may avoid the over high voltage of the collector terminal to damage the IGBT at the moment of turning off the IGBT. When the voltage of the collector terminal is larger than a second voltage threshold, a protection signal is outputted. In one embodiment of the present disclosure, the second voltage threshold may be 800V.

During the heating process of the battery group, if the user suddenly presses and holds the heating button for 2 seconds, the battery heater stops heating the battery group so that the battery group is not allowed to be charged and the electric vehicle is not allowed to be driven.

With the method for heating the battery of the power system of the electric vehicle according to embodiments of the present disclosure, the battery group of the electric vehicle may be heated without any external power supply. The battery group is heated to a required temperature and then may be charged or discharged normally. So the restriction on the use of the electric vehicle at the low temperature may be greatly reduced and the requirements of running and charging at the low temperature may be satisfied. Furthermore, by adjusting the heating power of the battery heater according to the real-time temperature of the battery group, it is possible to control the heating procedure more precisely to make better use of the performance of the battery group and increase the safety of the battery group.

In the preceding specification, the subject matter has been described with reference to specific exemplary embodiments. It will, however, be evident that various modifications and changes may be made without departing from the spirit and scope of the claimed subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:
1. A power system of an electric vehicle, comprising:
a battery group;
a battery heater, connected with the battery group and configured to charge and discharge the battery group to heat the battery group, wherein the battery heater comprises an output power adjusting module configured to adjust a heating power of the battery heater by adjusting at least one of a charge current and ai4/ef a discharge current;
a battery management device, connected with the battery group and the battery heater respectively, and configured to control the output power adjusting module to adjust the heating power of the battery heater to heat the battery group according to a temperature of the battery group when the temperature of the battery group is lower than a first heating threshold and a residual electric quantity of the battery group is larger than a parking electric quantity threshold;
an electric distribution box, configured to distribute a voltage output by the battery group;
a motor;
a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box; and
an isolation inductor, connected between the battery group and the electric distribution box, wherein an inductance of the isolation inductor matches with a capacitance of the pre-charging capacitor;

wherein the battery management device controls the electric vehicle go enter into a running heating mode when any of following conditions is satisfied:
  the temperature of the battery group is higher than a first temperature threshold and lower than a second temperature threshold, and the residual electric quantity of the battery group is larger than a first electric quantity threshold;
  the temperature of the battery group is higher than the second temperature threshold and lower than a third temperature threshold, and the residual electric quantity of the battery group is larger than a second electric quantity threshold, in which the second electric quantity threshold is lower than the first electric quantity threshold;
  the temperature of the battery group is higher than the third temperature threshold and lower than a fourth temperature threshold, and the residual electric quantity of the battery group is larger than a third electric quantity threshold, in which the third electric quantity threshold is lower than the second electric quantity threshold; and
  the temperature of the battery group is higher than the fourth temperature threshold and lower than a fifth temperature threshold, and the residual electric quantity of the battery group is larger than a fourth electric quantity threshold, in which the fourth electric quantity threshold is lower than the third electric quantity threshold.

2. The power system of claim 1, wherein the battery management device is further configured to control the electric vehicle to enter into a running heating mode when the temperature of the battery group is lower than the first heating threshold and the residual electric quantity of the battery group is larger than a running electric quantity threshold, in which the running electric quantity threshold is larger than the parking electric quantity threshold.

3. The power system of claim 2, wherein the battery management device is further configured to:
  judge whether the temperature of the battery group is higher than a sixth temperature threshold;
  when the temperature of the battery group is higher than the sixth temperature threshold, judge whether the residual electric quantity of the battery group is larger than a fifth electric quantity threshold, and when the residual electric quantity of the battery group is larger than a fifth electric quantity threshold, control the battery heater to heat the battery group in the running heating mode;
  when the temperature of the battery group is lower than the sixth temperature threshold, judge whether the temperature of the battery group is higher than a seventh temperature threshold;
  when the temperature of the battery group is higher than the seventh temperature threshold, judge whether the residual electric quantity of the battery group is larger than a sixth electric quantity threshold, and when the residual electric quantity of the battery group is larger than a sixth electric quantity threshold, control the battery heater to heat the battery group in the running heating mode, in which the sixth electric quantity threshold is larger than the fifth electric quantity threshold;
  when the temperature of the battery group is lower than the seventh temperature threshold, judge whether the temperature of the battery group is higher than an eighth temperature threshold;
  when the temperature of the battery group is higher than the eighth temperature threshold, judge whether the residual electric quantity of the battery group is larger than a seventh electric quantity threshold, and when the residual electric quantity of the battery group is larger than a seventh electric quantity threshold, control the battery heater to heat the battery group in the running heating mode, in which the seventh electric quantity threshold is larger than the sixth electric quantity threshold;
  when the temperature of the battery group is lower than the eighth temperature threshold, judge whether the temperature of the battery group is higher than a ninth temperature threshold; and
  when the temperature of the battery group is higher than the ninth temperature threshold, judge whether the residual electric quantity of the battery group is larger than an eighth electric quantity threshold, and when the residual electric quantity of the battery group is larger than an eighth electric quantity threshold, control the battery heater to heat the battery group in the running heating mode, in which the eighth electric quantity threshold is larger than the seventh electric quantity threshold.

4. The power system of claim 2, wherein the battery management device is further configured to control the electric vehicle to enter into a parking heating mode when the temperature of the battery group is lower than the first heating threshold and the residual electric quantity of the battery group is lower than the running electric quantity threshold but larger than the parking electric quantity threshold.

5. The power system of claim 4, wherein the battery management device controls the battery heater to heat the battery group in the parking heating mode when any of following conditions is satisfied:
  the temperature of the battery group is higher than a tenth temperature threshold and lower than an eleventh temperature threshold, and the residual electric quantity of the battery group is larger than a ninth electric quantity threshold;
  the temperature of the battery group is higher than the eleventh temperature threshold and lower than a twelfth temperature threshold, and the residual electric quantity of the battery group is larger than a tenth electric quantity threshold, in which the tenth electric quantity threshold is lower than the ninth electric quantity threshold;
  the temperature of the battery group is higher than the twelfth temperature threshold and lower than a thirteenth temperature threshold, and the residual electric quantity of the battery group is larger than an eleventh electric quantity threshold, in which the eleventh electric quantity threshold is lower than the tenth electric quantity threshold; and
  the temperature of the battery group is higher than the thirteenth temperature threshold and lower than a fourteenth temperature threshold, and the residual electric quantity threshold is larger than a twelfth electric quantity threshold, in which the twelfth electric quantity threshold is lower than the eleventh twelfth electric quantity threshold.

6. The power system of claim 4, wherein the battery management device is further configured to:
  judge whether the temperature of the battery group is higher than a fifteenth temperature threshold;

when the temperature of the battery group is higher than the fifteenth temperature threshold, judge whether the residual electric quantity of the battery group is larger than a thirteenth electric quantity threshold, and when the residual electric quantity of the battery group is larger than a thirteenth electric quantity threshold, control the battery heater to heat the battery group in the parking heating mode;

when the temperature of the battery group is lower than the fifteenth temperature threshold, judge whether the temperature of the battery group is higher than a sixteenth temperature threshold;

when the temperature of the battery group is higher than the sixteenth temperature threshold, judge whether the residual electric quantity of the battery group is larger than a fourteenth electric quantity threshold, and when the residual electric quantity of the battery group is larger than a fourteenth electric quantity threshold, control the battery heater to heat the battery group in the parking heating mode, in which the fourteenth electric quantity threshold is larger than the fifteenth electric quantity threshold;

when the temperature of the battery group is lower than the sixteenth temperature threshold, judge whether the temperature of the battery group is higher than a seventeenth temperature threshold;

when the temperature of the battery group is higher than the seventeenth temperature threshold, judge whether the residual electric quantity of the battery group is larger than a fifteenth electric quantity threshold, and when the residual electric quantity of the battery group is larger than a fifteenth electric quantity threshold, control the battery heater to heat the battery group in the parking heating mode, in which the fifteenth electric quantity threshold is larger than the fourteenth electric quantity threshold;

when the temperature of the battery group is lower than the seventeenth temperature threshold, judge whether the temperature of the battery group is higher than an eighteenth temperature threshold;

when the temperature of the battery group is higher than the eighteenth temperature threshold, judge whether the residual electric quantity of the battery group is larger than a sixteenth electric quantity threshold, and when the residual electric quantity of the battery group is larger than a sixteenth electric quantity threshold, control the battery heater to heat the battery group in the parking heating mode, in which the sixteenth electric quantity threshold is larger than the fifteenth electric quantity threshold.

7. The power system of claim 1, wherein:

when the temperature of the battery group is higher than a third heating threshold and lower than a fourth heating threshold, the battery management device controls the battery heater to heat the battery group with a first power;

when the temperature of the battery group is higher than the fourth heating threshold and lower than a fifth heating threshold, the battery management device controls the battery heater to heat the battery group with a second power, in which the second power is lower than the first power;

when the temperature of the battery group is higher than the fifth heating threshold and lower than a sixth heating threshold, the battery management device controls the battery heater to heat the battery group with a third power, in which the third power is lower than the second power; and when the temperature of the battery group is higher than the sixth heating threshold and lower than a seventh heating threshold, the battery management device controls the battery heater to heat the battery group with a fourth power, in which the fourth power is lower than the third power.

8. The power system of claim 1, wherein the battery heater further comprises:

a first switch module, a first terminal of the first switch module connected with a first electrode of the battery group and the isolation inductor respectively;

at least one first capacitor, wherein a first terminal of the at least one first capacitor is connected with a second terminal of the first switch module, and a second terminal of the at least one first capacitor is connected with a second electrode of the battery group;

a first inductor, wherein a first terminal of the first inductor is connected with a node between the first switch module and the at least one first capacitor; and a second switch module, wherein a first terminal of the second switch module is connected with a second terminal of the first inductor, and a second terminal of the second switch module is connected with the second electrode of the battery group, wherein a control terminal of the first switch module and a control terminal of the second switch module are connected with the battery management device, and the battery management device sends a heating signal to the control terminal of the first switch module and the control terminal of the second switch module to control the first switch module and the second switch module to turn on in turn so as to generate the charge current and the discharge current in turn, in which the first switch module is on when the second switch module is off, and the first switch module is off when the second switch module is on.

9. The power system of claim 8, wherein the output power adjusting module is further configured to adjust duty ratios of output pulses of the first switch module and the second switch module according to a first instruction sent by the battery management device.

10. The power system of claim 8, wherein the battery heater comprises a plurality of first capacitors, and the output power adjusting module is further configured to adjust a number of operational capacitors of the plurality of first capacitors according to a second instruction sent by the battery management device.

11. The power system of claim 1, further comprising a relay.

12. The power system of claim 1, wherein the electric distribution box comprises:

a primary contactor, configured to distribute the voltage output by the battery group to power consumption equipment of the electric vehicle; and a pre-charging-contactor, connected with the first input terminal or the second input terminal of the motor controller, and configured to charge the pre-charging capacitor under a control of the battery management device before the motor controller controls the motor to start.

13. An electric vehicle comprising a power system of claim 1.

14. A method for heating a battery group of an electric vehicle, comprising:

detecting a temperature and a residual electric quantity of the battery group;

when the temperature of the battery group is lower than a first heating threshold and the residual electric quantity of the battery group is larger than a parking electric quantity threshold, adjusting a heating power of a battery heater to heat the battery group according to the temperature of the battery group; and when the temperature of the battery group is lower than the first heating threshold and the residual electric quantity of the battery group is lower than the parking electric quantity threshold, indicating that the battery group is inhibited from being heated or charged and the electric vehicle is inhibited from being driven;

wherein the step of controlling the battery heater to heat the battery group in the running heating mode is performed when any of following conditions is satisfied:

the temperature of the battery group is higher than a first temperature threshold and lower than a second temperature threshold, and the residual electric quantity of the battery group is larger than a first electric quantity threshold;

the temperature of the battery group is higher than the second temperature threshold and lower than a third temperature threshold, and the residual electric quantity of the battery group is larger than a second electric quantity threshold, in which the second electric quantity threshold is lower than the first electric quantity threshold;

the temperature of the battery group is higher than the third temperature threshold and lower than a fourth temperature threshold, and the residual electric quantity of the battery group is larger than a third electric quantity threshold, in which the third electric quantity threshold is lower than the second electric quantity threshold; and the temperature of the battery group is higher than the fourth temperature threshold and lower than a fifth temperature threshold, and the residual electric quantity of the battery group is larger than a fourth electric quantity threshold, in which the fourth electric quantity threshold is lower than the third electric quantity threshold.

15. The method of claim 14, further comprising:

controlling the electric vehicle to enter into a running heating mode when the temperature of the battery group is lower than the first heating threshold and the residual electric quantity of the battery group is larger than a running electric quantity threshold, in which the running electric quantity threshold is larger than the parking electric quantity threshold.

16. The method of claim 15, wherein controlling the battery heater to heat the battery group in the running heating mode comprises:

judging whether the temperature of the battery group is higher than a sixth temperature threshold;

when the temperature of the battery group is higher than the sixth temperature threshold, judging whether the residual electric quantity of the battery group is larger than a fifth electric quantity threshold, and when the residual electric quantity of the battery group is larger than a fifth electric quantity threshold, controlling the battery heater to heat the battery group in the running heating mode;

when the temperature of the battery group is lower than the sixth temperature threshold, judging whether the temperature of the battery group is higher than a seventh temperature threshold;

when the temperature of the battery group is higher than the seventh temperature threshold, judging whether the residual electric quantity of the battery group is larger than a sixth electric quantity threshold, and when the residual electric quantity of the battery group is larger than a sixth electric quantity threshold, controlling the battery heater to heat the battery group in the running heating mode, in which the sixth electric quantity threshold is larger than the fifth electric quantity threshold;

when the temperature of the battery group is lower than the seventh temperature threshold, judging whether the temperature of the battery group is higher than an eighth temperature threshold;

when the temperature of the battery group is higher than the eighth temperature threshold, judging whether the residual electric quantity of the battery group is larger than a seventh electric quantity threshold, and when the residual electric quantity of the battery group is larger than a seventh electric quantity threshold, controlling the battery heater to heat the battery group in a running heating mode, in which the seventh electric quantity threshold is larger than the sixth electric quantity threshold;

when the temperature of the battery group is lower than the eighth temperature threshold, judging whether the temperature of the battery group is higher than a ninth temperature threshold; and when the temperature of the battery group is higher than the ninth temperature threshold, judging whether the residual electric quantity of the battery group is larger than an eighth electric quantity threshold, and when the residual electric quantity of the battery group is larger than an eighth electric quantity threshold, controlling the battery heater to heat the battery group, in which the eighth electric quantity threshold is larger than the seventh electric quantity threshold.

17. The method of claim 15, further comprising:

controlling the electric vehicle to enter into a parking heating mode when the temperature of the battery group is lower than the first heating threshold and the residual electric quantity of the battery group is lower than the running electric quantity threshold but larger than the parking electric quantity threshold.

18. The method of claim 17, further comprising: controlling the battery heater to heat the battery group in the parking heating mode; wherein the step of controlling the battery heater to heat the battery group in a parking heating mode is performed when any of following conditions is satisfied:

the temperature of the battery group is higher than a tenth temperature threshold and lower than an eleventh temperature threshold, and the residual electric quantity of the battery group is larger than a ninth electric quantity threshold;

the temperature of the battery group is higher than the eleventh temperature threshold and lower than a twelfth temperature threshold, and the residual electric quantity of the battery group is larger than a tenth electric quantity threshold, in which the tenth electric quantity threshold is lower than the ninth electric quantity threshold;

the temperature of the battery group is higher than the twelfth temperature threshold and lower than a thirteenth temperature threshold, and the residual electric quantity of the battery group is larger than an eleventh electric quantity threshold, in which the eleventh electric quantity threshold is lower than the tenth electric quantity threshold; and the temperature of the battery group is higher than the thirteenth temperature threshold and lower than a fourteenth temperature threshold, and the residual electric quantity threshold is larger than a twelfth electric quantity threshold, in which the twelfth electric quantity threshold is lower than the eleventh twelfth electric quantity threshold.

19. The method of claim 17, wherein controlling the battery heater to heat the battery group in the parking heating mode comprises:

judging whether the temperature of the battery group is higher than a fifteenth temperature threshold;

when the temperature of the battery group is higher than the fifteenth temperature threshold, judging whether the residual electric quantity of the battery group is larger than a thirteenth electric quantity threshold, and when the residual electric quantity of the battery group is larger than a thirteenth electric quantity threshold, controlling the battery heater to heat the battery group in the parking heating mode;

when the temperature of the battery group is lower than the fifteenth temperature threshold, judging whether the temperature of the battery group is higher than a sixteenth temperature threshold;

when the temperature of the battery group is higher than the sixteenth temperature threshold, judging whether the residual electric quantity of the battery group is larger than a fourteenth electric quantity threshold, and when the residual electric quantity of the battery group is larger than a fourteenth electric quantity threshold, controlling the battery heater to heat the battery group in the parking heating mode, in which the fourteenth electric quantity threshold is larger than the thirteenth electric quantity threshold;

when the temperature of the battery group is lower than the sixteenth temperature threshold, judging whether the temperature of the battery group is higher than a seventeenth temperature threshold;

when the temperature of the battery group is higher than the seventeenth temperature threshold, judging whether the residual electric quantity of the battery group is larger than a fifteenth electric quantity threshold and when the residual electric quantity of the battery group is larger than a fifteenth electric quantity threshold, controlling the battery heater to heat the battery group in the parking heating mode, in which the fifteenth electric quantity threshold is larger than the fourteenth electric quantity threshold;

when the temperature of the battery group is lower than the seventeenth temperature threshold, judging whether the temperature of the battery group is higher than an eighteenth temperature threshold;

when the temperature of the battery group is higher than the eighteenth temperature threshold, judging whether the residual electric quantity of the battery group is larger than a sixteenth electric quantity threshold, and when the residual electric quantity of the battery group is larger than a sixteenth electric quantity threshold, controlling the battery heater to heat the battery group in the parking heating mode, in which the sixteenth electric quantity threshold is larger than the fifteenth electric quantity threshold.

20. The method of claim 14, wherein adjusting a heating power of a battery heater to heat the battery group according to the temperature of the battery group comprises:

when the temperature of the battery group is larger than a third heating threshold and lower than a fourth heating threshold, controlling the battery heater to heat the battery group with a first power;

when the temperature of the battery group is larger than a fourth heating threshold and lower than a fifth heating threshold, controlling the battery heater to heat the battery group with a second power, in which the second power is lower than the first power;

when the temperature of the battery group is larger than a fifth heating threshold and lower than a sixth heating threshold, controlling the battery heater to heat the battery group with a third power, in which the third power is lower than the second power; and when the temperature of the battery group is larger than a sixth heating threshold and lower than a seventh heating threshold, controlling the battery heater to heat the battery group with a fourth power, the fourth power is lower than the third power.

21. The method of claim 14, further comprising:

calculating a current temperature of the battery group and a current residual electric quantity of the battery group;

calculating a maximum output power of the battery group according to the current temperature of the battery group and the current residual electric quantity of the battery group; and controlling the electric vehicle to run under a limited power according to the maximum output power of the battery group.

22. The method of claim 14, further comprising: controlling the battery heater to stop heating the battery group when any of following conditions is satisfied:

the temperature of the battery group is higher than the first heating threshold;

a temperature of any single battery in the battery group is higher than a second heating threshold, wherein the second heating threshold is larger than the first heating threshold; and a continuous heating time of the battery heater is larger than a heating time threshold.

* * * * *